United States Patent
Yan

(10) Patent No.: US 10,402,464 B2
(45) Date of Patent: Sep. 3, 2019

(54) METHODS AND APPARATUSES FOR OPENING A WEBPAGE, INVOKING A CLIENT, AND CREATING A LIGHT APPLICATION

(71) Applicant: BEIJING QIHOO TECHNOLOGY COMPANY LIMITED, Beijing (CN)

(72) Inventor: Tengfei Yan, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 575 days.

(21) Appl. No.: 15/038,339

(22) PCT Filed: Sep. 24, 2014

(86) PCT No.: PCT/CN2014/087331
§ 371 (c)(1),
(2) Date: May 20, 2016

(87) PCT Pub. No.: WO2015/074459
PCT Pub. Date: May 28, 2015

(65) Prior Publication Data
US 2016/0292291 A1    Oct. 6, 2016

(30) Foreign Application Priority Data

Nov. 21, 2013 (CN) .......................... 2013 1 0591415
Nov. 21, 2013 (CN) .......................... 2013 1 0594399
(Continued)

(51) Int. Cl.
G06F 17/27 (2006.01)
G06F 16/951 (2019.01)
(Continued)

(52) U.S. Cl.
CPC ........ *G06F 16/9558* (2019.01); *G06F 16/951* (2019.01); *G06F 16/957* (2019.01); *G06F 16/958* (2019.01); *G06F 17/2705* (2013.01)

(58) Field of Classification Search
CPC .......... G06F 17/30882; G06F 17/2705; G06F 17/30864; G06F 17/3089; G06F 17/30899;
(Continued)

(56) References Cited

U.S. PATENT DOCUMENTS 8,244,707 B2 * 8/2012 Lin ..................... G06F 17/3089
707/706
9,384,293 B2 * 7/2016 Oliver ............... G06F 17/30884
(Continued)

FOREIGN PATENT DOCUMENTS

CN    101799821 A    8/2010
CN    102118504 A    7/2011
(Continued)

OTHER PUBLICATIONS

International Search Report of the International Searching Authority for Application No. PCT/CN2014/08731, dated Dec. 22, 2014.

*Primary Examiner* — Hosain T Alam
*Assistant Examiner* — Saba Ahmed
(74) *Attorney, Agent, or Firm* — Alston & Bird LLP

(57) ABSTRACT

The invention provides methods and apparatuses for opening a webpage, invoking a client, and creating a light application. The method for opening a webpage comprises: receiving a webpage opening request containing a link; according to the link, searching a preset application list for a client application and/or a light application corresponding to the link; and when the client application and/or the light application exists in the application list, opening the client application and/or invoking the light application to open a webpage corresponding to the link. Thereby, a webpage corresponding to a link can be opened in a more friendly manner, the use of a user is facilitated, the efficiency of acquiring information by the user is improved, and the user experience is enhanced.

15 Claims, 12 Drawing Sheets

(30) Foreign Application Priority Data

Nov. 21, 2013 (CN) .......................... 2013 1 0594409
Nov. 21, 2013 (CN) .......................... 2013 1 0594423

(51) Int. Cl.
*G06F 16/955* (2019.01)
*G06F 16/957* (2019.01)
*G06F 16/958* (2019.01)

(58) Field of Classification Search
CPC .. G06F 16/9558; G06F 16/958; G06F 16/957; G06F 16/951
USPC .......................................................... 707/755
See application file for complete search history.

(56) References Cited

U.S. PATENT DOCUMENTS

| | | | | |
|---|---|---|---|---|
| 2011/0161479 A1* | 6/2011 | Freishtat | ................ | G06Q 30/02 709/223 |
| 2011/0161795 A1* | 6/2011 | Bellwood | ............... | G06F 17/24 715/210 |
| 2011/0197200 A1* | 8/2011 | Huang | .............. | G06F 17/30241 719/313 |
| 2011/0208801 A1* | 8/2011 | Thorkelsson | ....... | H04L 67/2814 709/203 |
| 2012/0005183 A1* | 1/2012 | Monteverde | ...... | G06F 17/30991 707/706 |
| 2012/0005186 A1* | 1/2012 | Monteverde | ...... | G06F 17/30867 707/707 |
| 2016/0019046 A1* | 1/2016 | Chen | ......................... | G06F 8/65 717/168 |
| 2016/0188181 A1* | 6/2016 | Smith | ..................... | G06F 3/048 715/765 |

FOREIGN PATENT DOCUMENTS

| | | |
|---|---|---|
| CN | 102970439 A | 3/2013 |
| CN | 102982106 A | 3/2013 |
| CN | 103108032 A | 5/2013 |
| CN | 103177106 A | 6/2013 |
| CN | 103179159 A | 6/2013 |
| CN | 103207794 A | 7/2013 |
| CN | 103297453 A | 9/2013 |
| CN | 103327135 A | 9/2013 |
| CN | 103368897 A | 10/2013 |
| CN | 103401935 A | 11/2013 |
| CN | 103617218 A | 3/2014 |
| CN | 103618777 A | 3/2014 |
| CN | 103678508 A | 3/2014 |
| CN | 103793459 A | 5/2014 |
| WO | WO 0173563 A1 | 10/2001 |

* cited by examiner

METHODS AND APPARATUSES FOR OPENING A WEBPAGE, INVOKING A CLIENT, AND CREATING A LIGHT APPLICATION

FIELD OF THE INVENTION

The invention relates to computer technologies, and in particular, to methods and apparatuses for opening a webpage, invoking a client, and creating a light application.

BACKGROUND OF THE INVENTION

With the development of the mobile internet, opening a webpage on a mobile terminal becomes more and more common.

In the prior art, ways of opening a webpage on a mobile terminal are all to open the webpage by means of a browser. In particular, the mobile terminal starts the browser in response to a webpage opening request containing a webpage link, the browser sends a request to a Web server according to the webpage link to request acquiring a webpage corresponding to the link, and when the Web server finds out the webpage, it sends the webpage to the browser of the mobile terminal, and the webpage is shown in the browser.

However, when using a mobile terminal to access a common internet website, bad consequences such as a cluttered page layout, a low loading speed, etc. will be generally caused due to the page being too large and the content being too much. Yet, a Wap (Wireless Application Protocol) website is generally adapted for accessing by a mobile terminal with a small screen, and is mainly a textual introduction, and its exhibition effect is less ideal.

Further, if a webpage is to be opened on a mobile terminal to transmit and share webpage data for other device, then in the related art, the way of opening a webpage on a mobile terminal will bring lot of inconvenience to a user, and even at most times, the data received by the mobile terminal can not be opened by a correct approach, which results in that the data can not be fully shared, and affects the user experience to a great extent.

In addition, when a user needs to use a certain light application, he needs to request a server for searching for the light application via a mobile phone side, and then the light application can be created at the mobile phone side. If the mobile phone side has no network currently, it can not send a request to the server, which causes inconvenience to the use by the user, and degrades the user experience.

SUMMARY OF THE INVENTION

In view of the above problems, the invention is proposed to provide methods and apparatuses for opening a webpage, invoking a client, and creating a light application, which overcome the above problems or at least partly solve or mitigate the above problems.

According to an aspect of the invention, there is proposed a method for opening a webpage, comprising: receiving a webpage opening request containing a link; according to the link, searching a preset application list for a client application and/or a light application corresponding to the link; and when the client application and/or the light application exists in the application list, opening the client application and/or invoking the light application to open a webpage corresponding to the link.

According to another aspect of the invention, there is proposed an apparatus for opening a webpage, comprising: a reception module configured to receive a webpage opening request containing a link; a search module configured to, according to the link, search a preset application list for a client application and/or a light application corresponding to the link; and an invocation module configured to, when the client application and/or the light application exists in the application list, open the client application and/or invoke the light application to open a webpage corresponding to the link.

According to the scheme of opening a webpage of the invention, it can be realized that when a webpage opening request containing a link is received, a client application or a light application corresponding to the link is searched in a preset client application list and/or a light application list, and then a requested webpage is opened by opening the searched client application or invoking the light application. Since a corresponding client application or light application is determined by a corresponding link and then a requested webpage is opened for a user by opening the client application or invoking the light application, problems that the use of the user is inconvenient, the user experience is poor, or the like, due to the texture of the webpage opened by the mobile terminal being poor, are avoided, that the webpage is opened or shown more friendly is realized, the use of the user is facilitated greatly, the efficiency of acquiring information by the user is increased, and the user experience is improved.

According to another aspect of the invention, there is proposed a method for opening a webpage, comprising: receiving a webpage opening request containing a link; according to the link, searching a pre-established light application list for a light application corresponding to the link; and when the light application exists in the light application list, opening a webpage corresponding to the link by invoking the light application.

According to another aspect of the invention, there is proposed an apparatus for opening a webpage, comprising: a reception module configured to receive a webpage opening request containing a link; a search module configured to, according to the link, search a pre-established light application list for a light application corresponding to the link; and an opening module configured to, when the light application exists in the light application list, open a webpage corresponding to the link by invoking the light application.

According to the scheme of opening a webpage of the invention, it can be realized that when a webpage opening request containing a link is received, a light application corresponding to the link is searched a pre-established light application list, and then a requested webpage is opened by invoking the found light application. Since a corresponding light application is determined by a corresponding link and then a requested webpage is opened for a user by invoking the light application, problems that the use of the user is inconvenient, the user experience is poor, or the like, due to the texture of the webpage opened by the mobile terminal being poor, are avoided, that the webpage is opened or shown more friendly is realized, the use of the user is facilitated greatly, the efficiency of acquiring information by the user is increased, and the user experience is improved.

According to another aspect of the invention, there is provided a method for invoking a client, comprising: receiving a webpage data package and parsing it; according to the parsed content, determining whether a client corresponding to the parsed content exists; and performing a corresponding invocation of the corresponding client according to the determined result.

According to another aspect of the invention, there is provided a client, comprising: a data receiver configured to receive a webpage data package; a data parser configured to parse the webpage data package; a determiner configured to, according to the parsed content, determine whether a client corresponding to the parsed content exists, obtain the determined result and perform a corresponding invocation.

According to embodiments of the invention, it is possible to parse a received webpage data package, and invoke a corresponding client according to the parsed content, which solves the problem that data can not be shared among devices since the received data can not be further processed in the prior art. By employing embodiments of the invention, it is possible to find whether a corresponding client exists according to a received webpage data package and perform an invocation, which further achieves a beneficial effect of performing reasonable and efficient processing on the received data, facilitates users to share data among different devices, and improves the user experience.

According to another aspect of the invention, there is provided a method for creating a light application, comprising: in response to a search request containing a keyword from a user, a first client searching a preset light application list for a light application corresponding to the keyword; and in response to a light application creation request from the user, the first client sending light application data of a light application to a second client so as to create the light application on the second client according to the light application data.

According to another aspect of the invention, there is provided a method for creating a light application, comprising: a second client receiving light application data from a first client, wherein the light application data is determined by the first client from a preset light application list according to a keyword contained in a search request from a user; and creating a light application on the second client according to the received light application data.

According to another aspect of the invention, there is provided a client, comprising: a first acquisition module configured to, in response to a search request containing a keyword from a user, search a preset light application list for a light application corresponding to the keyword; a determination module configured to, according to the keyword, determine light application data corresponding to the keyword from the light application list; and a sending module configured to, in response to a light application creation request from the user, send the light application data to a further client so as to create the light application according to the light application data.

According to another aspect of the invention, there is provided a client, comprising: a reception module configured to receive light application data from a further client, wherein the light application data is determined by the further client from a preset light application list according to a keyword contained in a search request from a user; and a creation module configured to create a light application according to the received light application data.

According to the schemes of creating a light application of the invention, it can be realized that a light application is created on a second client based on a search on a first client, thus enhances the flexibility of creating a light application, facilitates the use of a user, reduces redundant operations, and improves the user experience.

According to yet another aspect of the invention, there is provided a computer program comprising a computer readable code which causes a computing device to perform any of a method for opening a webpage, a method for invoking a client, and/or a method for creating a light application described above, when said computer readable code is running on the computing device.

According to still another aspect of the invention, there is provided a computer readable medium storing therein the computer program as described above.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

Figure 1:
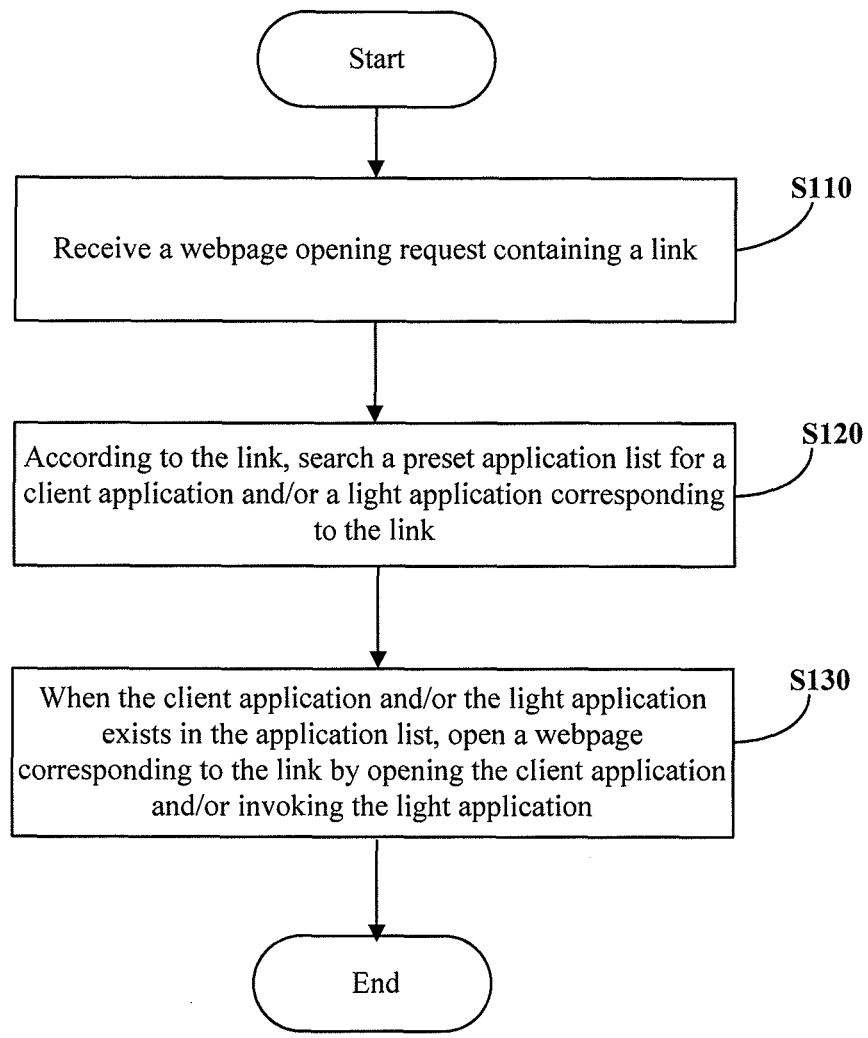
FIG. 1 shows a flow chart of a method for opening a webpage according to an embodiment of the invention.

In the following the invention will be further described in connection with the drawings and the particular embodiments.

As mentioned above, in the prior art, the processing of opening a webpage by a mobile terminal according to a link generally is: requesting a Web server for searching a webpage corresponding to the link by a browser, downloading the webpage to the mobile terminal, and then showing the webpage in the browser. However, when using a mobile terminal to access a common internet website, bad consequences such as a cluttered page layout, a low loading speed, etc. will be generally caused due to the page being too large and the content being too much. Yet, a Wap website is generally adapted for accessing by a mobile terminal with a small screen, and is mainly a textual introduction, and its exhibition effect is less ideal.

Mobile phone applications are well affirmed because of their rich exhibition effects and powerful functions, and can be planted into mobile terminals with different platforms, or also can be accessed by a browser of a mobile phone. A user can acquire information more directly, browses more easily and acquire the best user experience by multiple interactive modes such as microblog, sign-in, sharing, etc.

The inventors have observed that a local client application of a mobile terminal in fact can also show the content of a corresponding webpage. If the client application can be opened, problems that the use of the user is inconvenient, the efficiency of acquiring information is low, the user experience is poor, or the like, due to the texture of the webpage opened by the mobile terminal being poor, can be avoided.

In addition, the inventors have also observed that a light application is a fully functional application that does not need to be downloaded and can be used upon search; it has not only user experience comparable to or even beyond that of a client application (native app), but also characteristics of being retrievable and distributed intelligently of a network application (webapp), and will effectively solve the problem of docking high quality applications and services with demands of mobile users. Therefore, it is contemplated that if a webpage can be opened by invoking a light application, problems that the use of the user is inconvenient, the efficiency of acquiring information is low, the user experience is poor, or the like, due to the texture of the webpage opened by the mobile terminal being poor, can also be avoided.

Therefore, the invention provides two improved schemes of opening a webpage, a scheme of invoking a client and a scheme of creating a light application. First, in the first scheme of opening a webpage, a mobile terminal can maintain application lists with respect to client applications and light applications thereon, in which a correspondence relationship between domain names and client application data and a correspondence relationship between domain names and light application data can be stored. More specifically, the mobile terminal can maintain a client application list with respect to client applications thereon, in which the correspondence relationship between domain names and client application data is stored, and can maintain a light application list with respect to light applications thereon, in which the correspondence relationship between domain names and light application data is stored. When the mobile terminal receives a webpage opening request containing a link, according to the link, it is determined whether a client application or a light application corresponding to the link exists in the client application list and/or the light application list, and the client application is opened or the light application is invoked to open a webpage corresponding the link. Therefore, by opening the client application or invoking the light application to open a webpage, it is possible to avoid problems that the use if the user is inconvenient, the user experience is poor, or the like, due to the texture of the webpage opened by the mobile terminal being poor, realize that the webpage is opened or shown more friendly, greatly facilitate the use of the user, increase the efficiency of acquiring information by the user, and improve the user experience.

Second, in the second scheme of opening a webpage, a mobile terminal can maintain a light application list with respect to light applications thereon, in which a correspondence relationship between light application data and its corresponding access domain names is stored. When the mobile terminal receives a webpage opening request containing a link, according to the link, it parses out a domain name, then determines whether a light application corresponding to the domain name exists in the light application list, and when the light application exists in the light application list, opens a webpage corresponding to the link by invoking the light application.

Moreover, in the scheme of invoking a client of the invention, a mobile terminal parses a received webpage data package, and according to the parsed content, determines whether a client corresponding to the parsed content exists, and then performs a corresponding invocation of the corresponding client.

In addition, in the scheme of creating a light application of the invention, it is realized that a light application is created on a second client based on a search on a first client.

In the following, the first scheme of opening a webpage will be introduced, that is, a webpage corresponding to a link is opened by opening a client application on a mobile terminal or by invoking a light application on the mobile terminal.

In the following, methods and apparatuses for opening a webpage provided by embodiments of the invention will be described in more detail in connection with drawings.

FIG. 1 shows a flow chart of a method for opening a webpage according to an embodiment of the invention.

As shown in FIG. 1, at step S110, a webpage opening request containing a link is received.

In particular, a mobile terminal can receive a webpage opening request from other terminal device by ways of a long connection server, short information, an instant communication message, etc., wherein the mobile terminal may be a portable terminal such as a mobile phone, a notebook, a tablet, etc.

Further, for example, when a user requests to open a certain webpage by a mobile phone, at this point, the request for opening a webpage will contain an identifying or indicative link that represents the webpage, and this link is set for the purpose of connecting to the target webpage.

Next, at step S120, according to the link, a preset application list is searched for a client application and/or a light application corresponding to the link.

In particular, since it is to be realized that a requested webpage is opened by opening a client application and/or invoking a light application, it is necessary to find the client application and/or the light application corresponding to the requested webpage before this. To find such a client application and/or light application, it can be done by presetting one or more application list, such that a correspondence relationship between client applications and their corresponding domain names and a correspondence relationship between light applications and their corresponding domain names are comprised therein.

According to an embodiment of the invention, the application list can be a single list comprising a correspondence relationship between domain names and corresponding client application data and light application data.

According to a further embodiment of the invention, the application list can comprise a client application list and a light application list. The client application list can comprise a correspondence relationship between client application data and corresponding domain names. The light application list can comprise a correspondence relationship between light application data and corresponding domain names.

As for the client application list, in a specific embodiment, the client application list can be constructed by a server side according to client application download information of the mobile terminal. When a browser of the mobile terminal is opened, the client application list can be automatically downloaded or acquired from the server side to be used when a webpage is opened subsequently.

In a more preferred embodiment, the client application list can be constructed in advance by the mobile terminal locally. In particular, it can be done by acquiring a client application configuration file locally on the mobile terminal, then parsing the client application configuration file to acquire a client application domain name and a corresponding client application data object, and then storing the acquired client application domain name and corresponding client application data object in a client application list, thereby constructing the client application list locally on the mobile terminal. Since a client application needs to be downloaded to the locality of the mobile terminal, as compared to embodiments in which a client application list is acquired from a server side, the way of establishing and maintaining a client application list locally on the mobile terminal is more convenient and rapid.

According to an embodiment of the invention, the client application list can store client application information employing a key-value mode. For example, the domain name of a client application can be taken as a key, and the corresponding client application data object can be taken as a value, and they can be stored in the client application list by the key-value mode. Of course, in this application, the client application list is not limited to such a key-value storage mode, and instead, it can employ any other suitable storage mode known in the art or to be developed in the future.

According to a preferred embodiment of the invention, after establishing a client application list, the update of the client application configuration file can be conducted with respect to the preset client application list.

In a specific embodiment, the latest update time of the client application configuration file can be acquired, and when the interval from the latest update time to the current time is greater than a preset interval time, update the client application configuration file and update the client application list accordingly. Thereby, it can be achieved to update the client application list rapidly and increase the efficiency of opening a webpage.

More specifically, for example, the time at which the client application configuration file was updated the latest (which is 0 by default for the server) is read, and if the interval from the time at which the current client application configuration file was updated to the current time is greater than the preset time interval, the latest version number of the client application configuration file is acquired. Afterwards, according to its version number, the server side is requested to judge whether its version number is less than the version number of the client application configuration file in the server. If the client application version number in the server is equal to or greater than the requested version number, it is unnecessary to update the client application configuration file. For example, if the version number of the client application configuration file in the server is v2.0 and equal to the requested version number, at this point, it is unnecessary to update the client application configuration file, and it shows that the current version of the client application configuration file is the latest version. If the version number of the client application configuration file in the server is v2.2 and greater than the requested version number, at this point, it is necessary to update the client application configuration file in the mobile terminal to a version with the version number of v2.2. At the same time, the client application domain name and the corresponding client application data object in the updated client application configuration file are stored in the client application list.

In another specific embodiment, the client applicant list can also be updated in real time correspondingly when a user installs, updates or uninstalls a client application.

In addition to the above instances, the client applicant list can be further updated regularly or in real time by any other suitable way.

As for the light application list, in a specific embodiment, the light application list can be constructed in advance by the mobile terminal locally. In particular, it can be done by acquiring a light application configuration file locally on the mobile terminal, then parsing the light application configuration file to acquire a light application access domain name and a corresponding light application data object, and then storing the acquired light application access domain name and corresponding light application data object in a light application list, thereby constructing the light application list locally on the mobile terminal.

More specifically, it is possible to attempt to read a light application configuration file from the internal storage of the mobile terminal. That is, if the mobile terminal invoked the light application before, the configuration file of the light application can be acquired from the internal storage of the mobile terminal. When the light application configuration file can not be read from the internal storage of the mobile terminal, a corresponding light application configuration file can be acquired by reading an internal application program. That is, if the mobile terminal did not invoke the light application before, it is necessary to acquire the light application configuration file from an embedded application program.

Generally, the light application configuration file contains light application information such as a light application access domain name, a light application data object, etc. Therefore, by parsing the light application configuration file, a light application access domain name and a corresponding light application data object can be acquired for subsequently establishing the light application list to be used when opening a webpage.

According to an embodiment of the invention, the light application list can store light application information employing a key-value mode. For example, the domain name of a light application can be taken as a key, and the corresponding light application data object can be taken as a value, and they can be stored in the light application list by the key-value mode. Of course, in this application, the light application list is not limited to such a key-value storage mode, and instead, it can employ any other suitable storage mode known in the art or to be developed in the future.

In a more preferred embodiment, the light application list can be constructed by a server side according to light application creation information of the mobile terminal. When a browser of the mobile terminal is opened, the light application list can be automatically downloaded or acquired from the server side to be used when a webpage is opened subsequently. Since a light application is a fully functional application that can be used upon search, and does not need to be downloaded to and installed in the locality of the mobile terminal, it is more convenient for the server side to establish and maintain the light application list.

According to a preferred embodiment of the invention, after establishing a light application list, the update of the light application configuration file can be conducted with respect to the preset light application list.

In a specific embodiment, the latest update time of the light application configuration file can be acquired, and when the interval from the latest update time to the current time is greater than a preset interval time, update the light application configuration file and update the light application list accordingly. Thereby, it can be achieved to update the light application list rapidly and increase the efficiency of opening a webpage.

More specifically, for example, the time at which the light application configuration file was updated the latest (which is 0 by default for the server) is read, and if the interval from the time at which the current light application configuration file was updated to the current time is greater than the preset time interval, the latest version number of the light application configuration file is acquired. Afterwards, according to its version number, the server side is requested to judge whether its version number is less than the version number of the light application configuration file in the server. If the light application version number in the server is equal to or greater than the requested version number, it is unnecessary to update the light application configuration file. For example, if the version number of the light application configuration file in the server is v2.0 and equal to the requested version number, at this point, it is unnecessary to update the light application configuration file, and it shows that the current version of the light application configuration file is the latest version. If the version number of the light application configuration file in the server is v2.2 and greater than the requested version number, at this point, it is necessary to update the light application configuration file in the mobile terminal to a version with the version number of v2.2. At the same time, the light application access domain name and the corresponding light application data object in the updated light application configuration file are stored in the light application list.

In addition to the above instances, the light applicant list can be further updated regularly or in real time by any other suitable way.

According to embodiments of the invention, when receiving a webpage opening request containing a link, a mobile terminal can parse the link to acquire a domain name corresponding to the link, and then, according to the domain name, find whether a client application and/or a light application corresponding to the domain name, namely, a client application and/or a light application corresponding to the link, exists in a preset client application list and/or light application list.

Next, at step S130, when the client application and/or the light application corresponding to the link is found in the application list, a webpage corresponding to the link is opened by opening the client application and/or invoking the light application.

In particular, when the client application and/or the light application corresponding to the link is found in the application list, the currently requested webpage is opened by opening the client application and/or invoking the light application.

However, when the client application and/or the light application does not exist in the application list, a webpage corresponding to the link is opened by a common way in the prior art. For example, the webpage corresponding to the link is requested and acquired from a Web server by a browser, and then shown in the browser.

So far, a method for opening a webpage according to an embodiment of the invention has been described, wherein a preset application list is searched for a corresponding client application or light application through a link contained in a webpage opening request, and then the client application is opened or the light application is utilized to open a desired webpage. Thereby, problems that the use of the user is inconvenient, the user experience is poor, or the like, due to the texture of the webpage opened by the mobile terminal being poor, are avoided, that the webpage is opened or shown more friendly is realized, the use of the user is facilitated greatly, the efficiency of acquiring information by the user is increased, and the user experience is improved.

In the following, a method for opening a webpage according to another embodiment of the invention will be described in connection with FIG. 2, wherein a situation is described in which a webpage opening request is received from a long connection server. In a typical scenario, when a user wants to forward a certain webpage that is being browsed at a PC side to a mobile phone side for browsing continuously, data of the webpage can be sent to the mobile phone side by the long connection server, so as to open a corresponding webpage at the mobile phone side.

Figure 2:
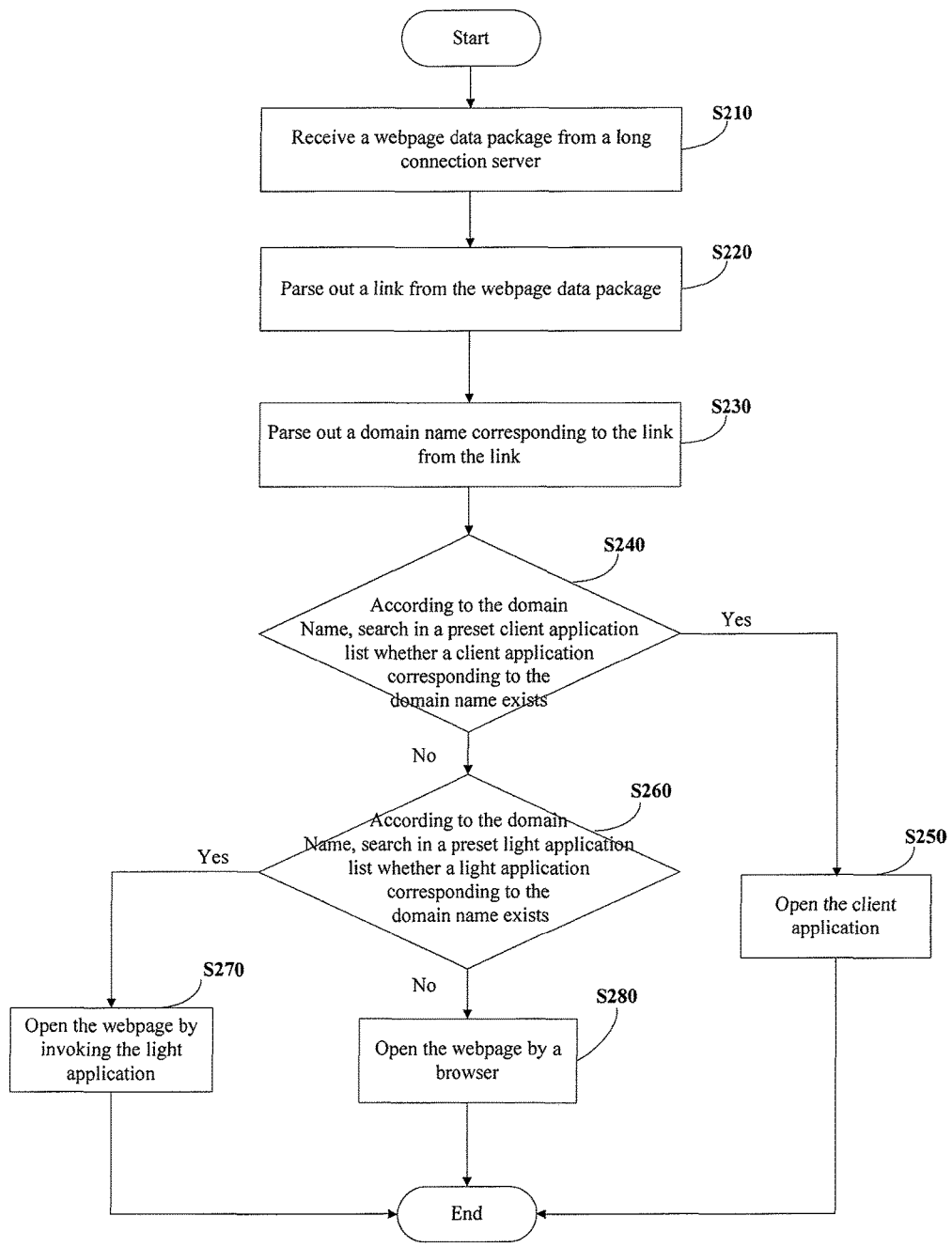
FIG. 2 shows a flow chart of a method for opening a webpage according to another embodiment of the invention.

FIG. 2 shows a flow chart of a method for opening a webpage according to another embodiment of the invention. As shown in FIG. 2, at step S210, a webpage data package is received from a long connection server.

In particular, the long connection server is configured to establish a data transmission link between a PC client and a mobile phone client, a PC and a PC, a mobile phone and other mobile terminal, or the like. For example, a PC client can send a webpage data package to a mobile phone client through the long connection server.

Further, when the long connection server sends a webpage data package to a mobile phone, it can conduct rapid transmission according to user registered information established in advance by the long connection server between it and the mobile phone, or by a way of command information, etc., and achieve the security of information transmission For example, a correspondence relation table (a client application list) of domain names with package names and main interfaces of corresponding mobile phone clients can be as shown in the following table 1.

TABLE 1

| Website domain name | Package name of mobile phone client corresponding to website | Name of main page of client |
|---|---|---|
| taobao.com | com.taobao.taobao | com.taobao.tao.Welcome |
| ganji.com | com.ganji.android | com.ganji.android.control.LaunchActivity |
| qzone.com | com.qzone | com.tencent.sc.activity.SplashActivity |
| youku.com | com.youku.phone | com.youku.phone.ActivityWelcome |
| . . . | . . . | . . . |

Still further, for example, a PC side browser has established a long connection with a browser of a mobile terminal, and the PC side browser sends a webpage data package to the mobile terminal. At this point, the webpage data package will first pass through a PC side server, and by a registered account or shadow account of a user on a browser, the PC side server will transfer the webpage data package to a long connection server of the corresponding account, wherein the registered account can be an email or a mobile phone number, whereas the shadow account can be a character string generated by a server which can be taken as a unique identification. In particular, the shadow account can be generated randomly by a server, and after generated, it is checked whether this has already existed, and if yes, it is regenerated, until this account did not exist. After receiving the webpage data package, the long connection server will send the webpage data package to the corresponding mobile terminal (e.g., a mobile phone) which has already established a long connection with it, and the mobile terminal will perform corresponding operations after receiving the registered information and parsing its registered information, wherein the operations comprise opening a webpage, merging a nine-rectangle-grid, updating the favorites, or the like.

Next, at step S220, a link is parsed out from the webpage data package.

In particular, after receiving the webpage data package, the mobile terminal parses the webpage data package to acquire a link of its webpage.

At step S230, a domain name corresponding to the link is parsed out from the link.

In particular, generally a link contains a domain name of a corresponding website, and therefore, a domain name corresponding to the link can be parsed out from the link, namely, the domain name of a corresponding website. For example, for a link http://list.taobao.com/itemlist, the domain name acquired according to a rule is taobao.com.

At step S240, according to the domain name, it is searched in a preset client application list whether a client application corresponding to the domain name exists.

In particular, as mentioned above, a client application list can contain a correspondence relationship between client application domain names and client application data objects. The mobile terminal can match the parsed domain name with domain names of client applications in the client application list. If there is a matching domain name, it can be determined that a client application corresponding to the domain name is found in the client application list. If there is no matching domain name, it can be determined that there is no client application corresponding to the domain name in the client application list.

The processing of this step is similar to that of the step S120, and therefore, other details can refer to the foregoing description with respect to the step S120, and will not be repeated here.

When at the step S240 a client application corresponding to the domain name is found in the preset client application list, step S250 is performed.

At the step S250, the client application is opened.

In particular, a client application data object corresponding to the link can be found by the client application list, and therefore, a corresponding webpage can be opened by invoking the client application data object.

In a specific embodiment, the execution code can be as follows:

```
public static void startApp(Context context,PackgeInfo info){
    Intent intent = new Intent( );
    intent.setComponent(new ComponentName(info.packageName,
    info.homePage));
    context.startActivity(intent);
}
```

Still taking the above instance as an example, according to taobao.com, the package name com.taobao.taobao of a mobile phone client corresponding to the website can be acquired from the client application list. Then, com.taobao.taobao can be acquired by a package manager. A corresponding client application can be opened by executing the above code. After the corresponding client application is opened, the content of the webpage that a user wanted to access before may be shown.

When at the step S240 a client application corresponding to the domain name is not found in the preset client application list, step S260 is performed.

At the step S260, according to the domain name, it is searched in a preset light application list whether a light application corresponding to the domain name exists.

In particular, as mentioned above, a light application list can contain a correspondence relationship between light application access domain names and light application data objects. The mobile terminal can parse out a domain name corresponding to the link from the received link as at the step S230, and then match the parsed domain name with access domain names of light applications in the light application list. If there is a matching domain name, it can be determined that a light application corresponding to the domain name is found in the light application list. If there is no matching domain name, it can be determined that there is no light application corresponding to the domain name in the light application list.

When at the step S260 a light application corresponding to the domain name is found in the preset light application list, step S270 is performed.

At the step S270, a webpage corresponding to the link is opened by invoking the light application.

In particular, a light application data object corresponding to the link can be found by the light application list, and therefore, the corresponding webpage can be opened by invoking the light application data object.

In a specific embodiment, the execution code may be as follows:

```
public static void startApp(Context context, WebappInfo info){
//This is to invoke a specific execution action of opening a light application
Intent intent = new Intent("com.qihoo.browser.action.WEBAPP_LINK");
//Transfer the light application information as a parameter
Intent.putExtra("data",info);
   context.startActivity(intent);
}
```

In turn, when receiving a request for invoking a light application to open a webpage, according to a domain name corresponding to a link URL (Uniform Resource Locator) carried in the user request, the mobile terminal searches the preset light application list for a corresponding light application, and if data of a light application corresponding to the domain name exists, it can open the light application corresponding to the link by invoking the startApp( ) method.

When at the step S260 a light application corresponding to the domain name is not found in the preset light application list, step S280 is performed.

At the step S280, the webpage is opened by a browser.

In particular, when a light application corresponding to the domain name is not found, the webpage corresponding to the link can be requested and acquired from a Web server by a browser, and then shown in the browser. That is, the webpage is opened by a way in the prior art.

So far, a method for opening a webpage according to another embodiment of the invention has been described in connection with FIG. 2. The method for opening a webpage according to the embodiment can friendly show a webpage by invoking a client application or a light application, avoid problems that the use of the user is inconvenient, the user experience is poor, or the like, due to the texture of the webpage opened by the mobile terminal being poor, greatly facilitate the use of the user, increase the efficiency of acquiring information by the user, and improve the user experience.

It should be understood by the skilled in the art that the invention is not limited to receiving a webpage opening request from a long connection server as shown in FIG. 2, and it may be further received in any other way of short information, an instant communication message, etc. However, regardless of the way in which the webpage opening request is received, the requested webpage can be opened by invoking a client application or a light application corresponding to the link.

In so far, methods for opening a webpage according to embodiments of the invention have been described in connection with FIG. 1 and FIG. 2. Although the above embodiments have described that a client application list and a light application list respectively maintain a correspondence relationship between client applications and domain names and a correspondence relationship between light applications and domain names, it should be understood that, this application is not limited thereto, and instead, they may have various other variations. For example, the client application list and the light application list can be merged into an application list so as to maintain the correspondence relationships between domain names and corresponding client applications and light applications in one and the same application list.

In addition, although in the above embodiments it has been described to first search in a preset client application list whether there is a client application corresponding to a domain name corresponding to a link, and if a corresponding client application is not found, then search in a preset light application list whether there is a light application corresponding to the domain name, this application is not limited thereto, and instead, various other variations may be made thereto. For example, it is possible to first search in a preset light application list whether there is a light application corresponding to a domain name corresponding to a link, and if a corresponding light application is not found, then search in a preset client application list whether there is a client application corresponding to the domain name. Additionally, the search can be simultaneously conducted in the two lists.

Similar to the methods for opening a webpage, an embodiment of the invention further provides a corresponding apparatus for opening a webpage.

Figure 3:
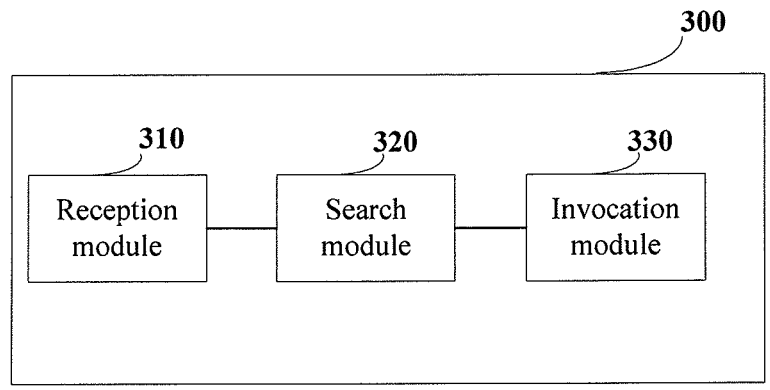
FIG. 3 shows a structural block diagram of an apparatus for opening a webpage according to an embodiment of the invention.

Reference is made to FIG. 3, which shows a structural block diagram of an apparatus for opening a webpage according to an embodiment of the invention.

As shown in FIG. 3, the apparatus 300 can comprise a reception module 310, a search module 320 and an invocation module 330.

In particular, the reception module 310 can be configured to receive a webpage opening request containing a link. The search module 320 can be configured to, according to the link, search a preset application list for a client application and/or a light application corresponding to the link. The invocation module 330 can be configured to, when the client application and/or the light application exists in the application list, open a webpage corresponding to the link by opening the client application and/or invoking the light application.

According to an embodiment of the invention, the search module 320 can further comprise: a first search sub-module configured to, according to the link, search a preset client application list for a client application corresponding to the link; a first invocation sub-module configured to, when the client application exists in the client application list, open the client application; a second search sub-module configured to, when the client application does not exist in the client application list, according to the link, search a preset light application list for a light application corresponding to the link; and a second invocation sub-module configured to, when the light application exists in the light application list, open a webpage corresponding to the link by invoking the light application.

According to an embodiment of the invention, the reception module 310 may further comprise: a reception sub-module configured to receive a webpage data package from a long connection server; and a parse sub-module configured to parse out a link from the webpage data package.

According to a specific embodiment of the invention, the first search sub-module may further comprise: a domain name parsing sub-module configured to parse out a domain name corresponding to the link from the link; and a domain name search sub-module configured to, according to the domain name, search the preset client application list for a client application corresponding to the domain name.

According to a specific embodiment of the invention, the first search sub-module can further comprise: an acquisition sub-module configured to acquire a client application configuration file; a parse sub-module configured to parse the client application configuration file to acquire a client application domain name and a corresponding client application data object; and a storage sub-module configured to store the acquired client application domain name and corresponding client application data object in the client application list.

According to a specific embodiment of the invention, the second search sub-module may further comprise: a domain name parsing sub-module configured to parse out a domain name corresponding to the link from the link; and a domain name search sub-module configured to, according to the domain name, search the preset light application list for a light application corresponding to the domain name.

According to a specific embodiment of the invention, the second search sub-module can further comprise: a first acquisition sub-module configured to acquire a light application configuration file; a parse sub-module configured to parse the light application configuration file to acquire a light application access link and a corresponding light application data object; and a storage sub-module configured to store the acquired light application access link and corresponding light application data object in the light application list.

According to a specific embodiment of the invention, the second search sub-module can further comprise: a second acquisition sub-module configured to acquire the latest update time of the light application configuration file; and an update sub-module configured to, when the interval from the latest update time to the current time is greater than a preset interval time, update the light application configuration file and update the light application list accordingly.

According to an embodiment of the invention, the invocation module 330 can be further configured to, when the client application and/or the light application does not exist in the application list, open a webpage by a browser.

So far, an apparatus for opening a webpage according to embodiments of the invention has been described. Similar to the above methods, according to the apparatus, it can equally open a requested webpage by invoking a client application or a light application, thereby avoid problems that the use of the user is inconvenient, the user experience is poor, or the like, due to the texture of the webpage opened by the mobile terminal being poor, realize that a webpage is opened or shown more friendly, greatly facilitate the use of the user, increase the efficiency of acquiring information by the user, and improve the user experience.

Since the processing of the apparatus for opening a webpage corresponds to the methods for opening a webpage described in connection with FIG. 1 and FIG. 2, its specific details can refer to the methods for opening a webpage described before and will not be repeated here.

In the above the first scheme of opening a webpage has been introduced, and in the following, the second scheme of opening a webpage will be introduced, that is, opening a webpage corresponding to the link by invoking the light application.

Since a light application is an enhanced webpage application that is based on the retrieval and intelligent distribution characteristics of search and that does not need to be downloaded and can be used upon search, by invoking a light application to open a webpage, it can avoid interference of an application such as a plug-in that comes with a browser to viewing a webpage by a user, open or show the webpage more friendly, facilitate the use of the user, and improve the user experience.

In the following, a method and apparatus for opening a webpage provided by embodiments of the invention will be described in more detail in connection with the drawings.

Figure 4:
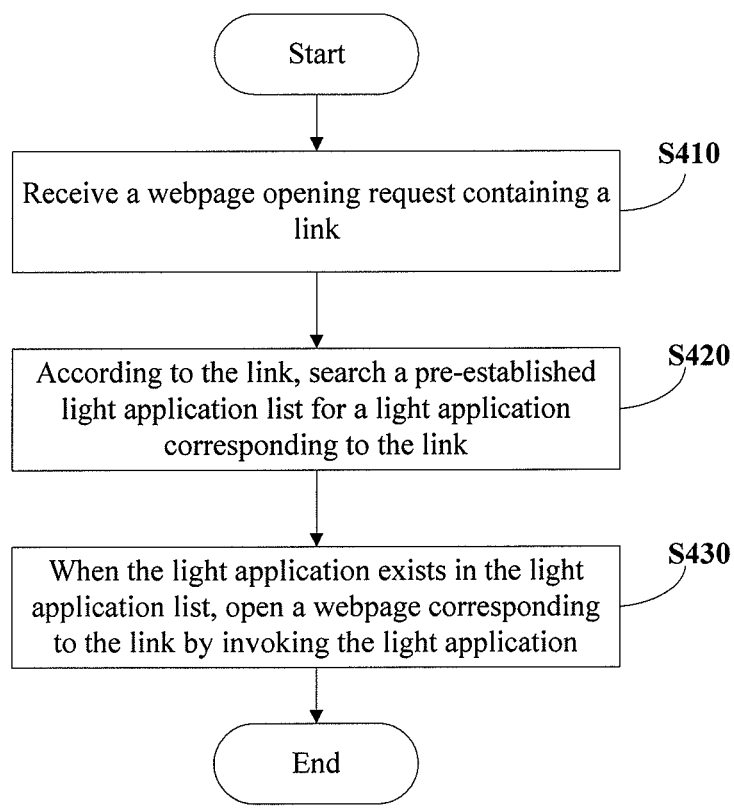
FIG. 4 shows a flow chart of a method for opening a webpage according to still another embodiment of the invention.

FIG. 4 shows a flow chart of a method for opening a webpage according to yet another embodiment of the invention.

As shown in FIG. 4, at step S410, a webpage opening request containing a link is received.

In particular, a mobile terminal can receive a webpage opening request from other terminal device by ways of a long connection server, short information, an instant communication message, etc., wherein the mobile terminal can be a portable terminal such as a mobile phone, a notebook, a tablet, etc.

Further, for example, when a user requests to open a certain webpage by a mobile phone, at this point, the request for opening a webpage will contain an identifying or indicative link representative of the webpage, and this link is for purpose of connection to the target webpage.

Next, at step S420, according to the link, a pre-established light application list is searched for a light application corresponding to the link.

In particular, since it is to be realized that a requested webpage is opened by invoking a light application, it is necessary to find the light application corresponding to the requested webpage before this. To find such a light application, the mobile terminal can establish a light application list in advance, such that links and light applications corresponding to the links are comprised therein. Then, when it is necessary to open a webpage, a link of the webpage is utilized to search the light application list to find a light application corresponding to the link of the webpage. In particular, the link can be used to traverse the light application list, or a search can be conducted in terms of which category the link belongs to. As for how to establish a light application list, a detailed description will be made later with reference to FIG. 6.

Next, at step S430, when the light application exists in the light application list, a webpage corresponding to the link is opened by invoking the light application.

In particular, when a light application corresponding to the link is found in the light application list, the light application is invoked to open the currently requested webpage. That is, opening the light application opens the webpage that is requested to be opened.

However, when the light application does not exist in the light application list, a webpage corresponding to the link is opened by a common way in the prior art. For example, the webpage corresponding to the link is requested and acquired from a Web server by a browser, and then shown in the browser.

So far, a method for opening a webpage according to still another embodiment of the invention has been described, wherein a preset light application list is searched for a corresponding light application by a link contained in a webpage opening request, and then the light application is utilized to open a desired webpage. Thereby, that the webpage is shown more friendly is realized, the use of the user is facilitated, and the user experience is improved.

In the following, a method for opening a webpage according to yet still another embodiment of the invention will be described in connection with FIG. 5, wherein a situation is described in which a webpage opening request is received from a long connection server. In a typical scenario, when a user wants to forward a certain webpage that is being browsed at a PC side to a mobile phone side for browsing continuously, data of the webpage can be sent to the mobile phone side through the long connection server, so as to open a corresponding webpage at the mobile phone side.

Figure 5:
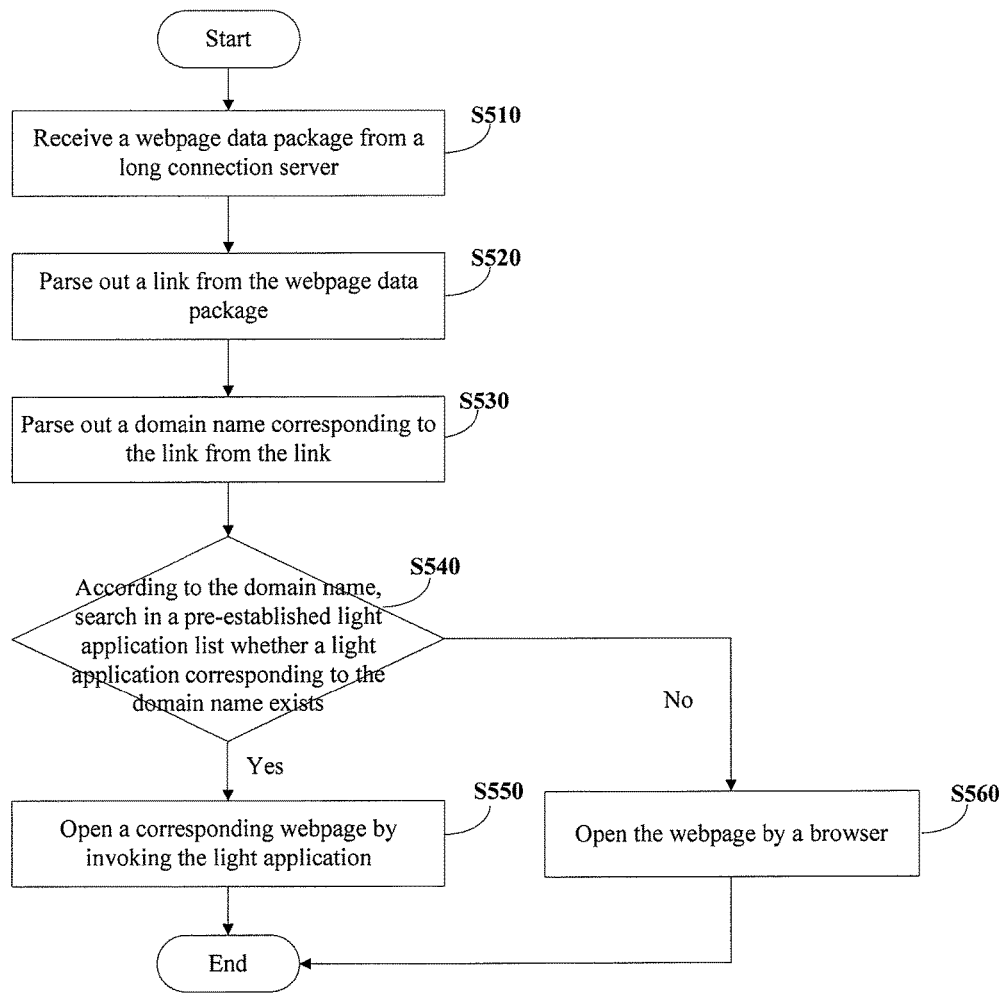
FIG. 5 shows a flow chart of a method for opening a webpage according to yet still another embodiment of the invention.

FIG. 5 shows a flow chart of a method for opening a webpage according to yet still another embodiment of the invention.

As shown in FIG. 5, at step S510, a webpage data package is received from a long connection server.

In particular, the long connection server is configured to establish a data transmission link between a PC client and a mobile phone client, a PC and a PC, a mobile phone and other mobile terminal, or the like. For example, a PC client can send a webpage data package to a mobile phone client through the long connection server.

Further, when the long connection server sends a webpage data package to a mobile phone, it can conduct rapid transmission according to user registered information established in advance by the long connection server between it and the mobile phone, or by a way of command information, etc., and achieve the security of information transmission Still further, for example, a PC side browser has established a long connection with a browser of a mobile terminal, and the PC side browser sends a webpage data package to the mobile terminal. At this point, the webpage data package will first pass through a PC side server, and by a registered account or shadow account of a user on a browser, the PC side server will transfer the webpage data package to a long connection server of the corresponding account, wherein the registered account can be an email or a mobile phone number, whereas the shadow account can be a character string generated by a server which can be taken as a unique identification. In particular, the shadow account may be generated randomly by a server, and after generated, it is checked whether this has already existed, and if yes, it is regenerated, until this account did not exist. After receiving the webpage data package, the long connection server will send the webpage data package to the corresponding mobile terminal (e.g., a mobile phone) which has already established a long connection with it, and the mobile terminal will perform corresponding operations after receiving the registered information and parsing its registered information, wherein the operations comprise opening a webpage, merging a nine-rectangle-grid, updating the favorites, or the like.

Next, at step S520, a link is parsed out from the webpage data package.

In particular, after receiving the webpage data package, the mobile terminal parses the webpage data package to acquire a link to its webpage.

At step S530, a domain name corresponding to the link is parsed out from the link.

In particular, generally a link contains a domain name of a corresponding website, and therefore, a domain name corresponding to the link from the link can be parsed out, namely, the domain name of a corresponding website. For example, for a link http://list.taobao.com/itemlist, the domain name acquired according to a rule is taobao.com.

At step S540, according to the domain name, it is searched in a pre-established light application list whether a light application corresponding to the domain name exists.

In particular, a light application list can contain a correspondence relationship between light application access domain names and light application data objects. The mobile terminal can match the received domain name with access domain names of light applications in the light application list. If there is a matching domain name, it can be determined that a light application corresponding to the domain name is found in the light application list. If there is no matching domain name, it can be determined that there is no light application corresponding to the domain name in the light application list.

When at the step S540 a light application corresponding to the domain name is found in the pre-established light application list, step S550 is performed.

At the step S550, a webpage corresponding to the link is opened by invoking the light application.

In particular, when the mobile terminal opens a webpage desired by a user, it can utilize the parsed domain name to search the light application list to find a light application corresponding to the domain name.

In a specific embodiment, the execution code may be as follows:

```
public static void startApp(Context context, WebappInfo info){
// This is to invoke a specific execution action of opening a light application
Intent intent = new Intent("com.qihoo.browser.action.WEBAPP_LINK");
// Transfer the light application information as a parameter
Intent.putExtra("data",info);
context.startActivity(intent);
}
```

From the above instance, first, the mobile terminal will attempt to read a corresponding light application configuration file from the light application list, and store it in a memory (Map) of the mobile terminal with a domain name in the light application list as a key and WebAppInfo as a value, wherein the data stored in the Map resides in the memory permanently. If a corresponding configuration file can not be read in the light application list, the mobile terminal will turn to internal application programs to attempt to find a light application configuration file, and likewise store it in the Map with the domain name of a URL of a link to a light application as a key, and the WebappInfo data object as a value.

Then, when receiving a request for invoking a light application to open a webpage, according to the URL of a link carried in the user request, the mobile terminal parses out its corresponding domain name, then acquires corresponding light application data in the light application list according to the domain name, opens a light application corresponding to the domain name by invoking the startApp( ) method, and then opens a webpage corresponding to the link. Otherwise, the link is opened directly with a browser.

When at the step S530 a light application corresponding to the domain name is not found in the pre-established light application list, step S560 is performed.

At the step S560, the webpage is opened by a browser.

In particular, when a light application corresponding to the domain name is not found, the webpage corresponding to the link can be requested and acquired from a Web server by a browser, and then shown in the browser. That is, the webpage is opened by a way in the prior art.

So far, a method for opening a webpage according to yet still another embodiment of the invention has been described in connection with FIG. 5. The method for opening a webpage according to the embodiment also can friendly show a webpage by invoking a light application, avoid interference of an application such as a plug-in that comes with a browser to viewing a webpage by a user, facilitate the use of the user, and at the same time improve the user experience.

It should be understood by the skilled in the art that the invention is not limited to receiving a webpage opening request from a long connection server as shown in FIG. 5, and it can be further received in any other way of short information, an instant communication message, etc. However, regardless of the way in which the webpage opening request is received, the requested webpage can be opened by invoking a light application corresponding to the link.

Figure 6:
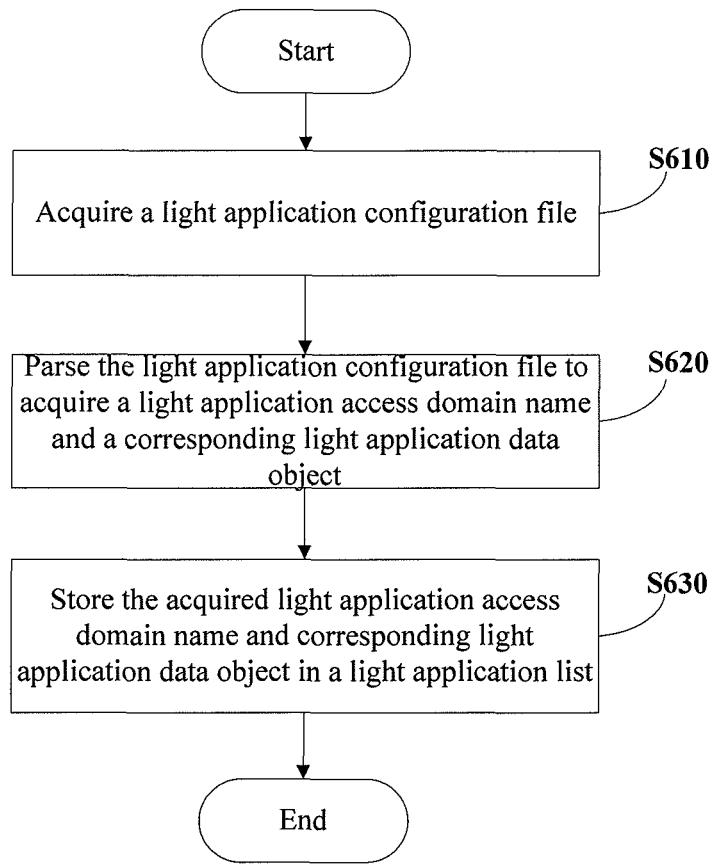
FIG. 6 shows a flow chart of a method for establishing a light application list according to an embodiment of the invention.

In the following, the above procedure of establishing a light application list will be described in detail in connection with FIG. 6. FIG. 6 shows a flow chart of a method for establishing a light application list according to an embodiment of the invention.

As shown in FIG. 6, at step S610, a light application configuration file is acquired.

According to an embodiment of this application, it is possible to attempt to read a light application configuration file from an internal storage of a mobile terminal. That is, if the mobile terminal invoked the light application before, then a configuration file of the light application can be acquired from the internal storage of the mobile terminal.

According to an embodiment of this application, when a light application configuration file can not be read from the internal storage of the mobile terminal, a corresponding light application configuration file can be acquired by reading an internal application program. That is to say, if the mobile terminal did not invoke the light application before, it is necessary to acquire the light application configuration file from an internal application program.

At step S620, the light application configuration file is parsed to acquire a light application access domain name and a corresponding light application data object.

In particular, generally, the light application configuration file contains light application information such as a light application access domain name, a light application data object, etc. Therefore, by parsing the light application configuration file, a light application access domain name and a corresponding light application data object can be acquired for subsequently establishing the light application list for use when opening a webpage.

At step S630, the acquired light application access domain name and corresponding light application data object are stored in a light application list.

According to an embodiment of the invention, the light application list can store light application information employing a key-value mode. For example, the access domain name of a light application can be taken as a key, and the corresponding light application data object can be taken as a value, and they can be stored in the light application list by the key-value mode.

Of course, this application is not limited to such a key-value storage mode, and instead, it can employ any other suitable storage mode known in the art or to be developed in the future.

According to a preferred embodiment of the invention, after establishing a light application list by the steps S610 to S630, the update of the light application configuration file can be conducted with respect to the pre-established light application list.

In a specific embodiment, the latest update time of the light application configuration file can acquired, and when the interval from the latest update time to the current time is greater than a preset interval time, update the light application configuration file and update the light application list accordingly. Thereby, it can be achieved to update the light application list rapidly and increase the efficiency of opening a webpage.

More specifically, for example, the time at which the light application configuration file was updated the latest (which is 0 by default for the server) is read, and if the interval from the time at which the current light application configuration file was updated to the current time is greater than the preset time interval, the latest version number of the light application configuration file is acquired. Afterwards, according to its version number, the server side is requested to judge whether its version number is less than the version number of the light application configuration file in the server. If the light application version number in the server is equal to or greater than the requested version number, it is unnecessary to update the light application configuration file. For example, if the version number of the light application configuration file in the server is v2.0 and equal to the requested version number, at this point, it is unnecessary to update the light application configuration file, and it shows that the current version of the light application configuration file is the latest version. If the version number of the light application configuration file in the server is v2.2 and greater than the requested version number, at this point, it is necessary to update the light application configuration file in the mobile terminal to a version with the version number of v2.2. At the same time, the light application access domain name and the corresponding light application data object in the updated light application configuration file are stored in the light application list.

In addition to the above instances, the light applicant list can be further updated regularly or in real time by any other suitable way.

In so far, methods for opening a webpage according to embodiments of the invention have been described in connection with FIG. 4 to FIG. 6. Similar to the methods for opening a webpage, an embodiment of the invention further provides a corresponding apparatus for opening a webpage.

Figure 7:
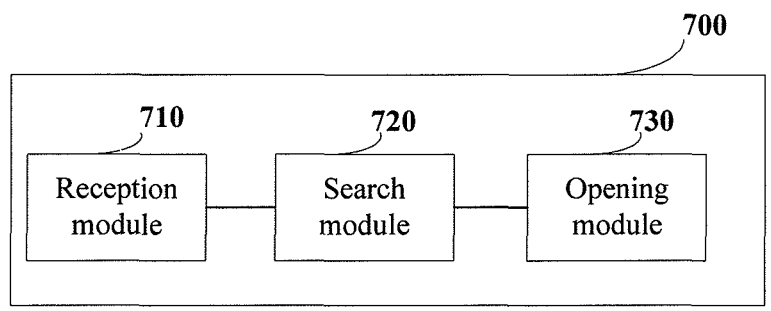
FIG. 7 shows a structural block diagram of an apparatus for opening a webpage according to another embodiment of the invention.

Reference is made to FIG. 7, which shows a structural block diagram of an apparatus for opening a webpage according to another embodiment of the invention.

As shown in FIG. 7, the apparatus 700 may comprise a reception module 710, a search module 720 and an opening module 730.

The reception module 710 can be configured to receive a webpage opening request containing a link.

According to an embodiment of the invention, the reception module 710 can further comprise:

a reception sub-module, which can be configured to receive a webpage data package from a long connection server; and a parse sub-module, which can be configured to parse out a link from the webpage data package.

The search module 720 can be configured to, according to the link, search a pre-established light application list for a light application corresponding to the link.

According to an embodiment of the invention, the search module 720 can further comprise:

a first parse sub-module, which can be configured to parse out a domain name corresponding to the link from the link; and a search sub-module, which can be configured to, according to the domain name, search the pre-established light application list for a light application corresponding to the domain name.

According to an embodiment of the invention, the search module 720 can further comprise:

a first acquisition sub-module, which can be configured to acquire a light application configuration file;

a second parse sub-module, which can be configured to parse the light application configuration file to acquire a light application access domain name and a corresponding light application data object; and a storage sub-module, which can be configured to store the acquired light application access domain name and corresponding light application data object in the light application list.

According to a more specific embodiment of the invention, the search module 720 can further comprise:

a second acquisition sub-module configured to acquire the latest update time of the light application configuration file; and an update sub-module configured to, when the interval from the latest update time to the current time is greater than a preset interval time, update the light application configuration file and update the light application list accordingly.

The opening module 730 can be configured to, when the light application exists in the light application list, open a webpage corresponding to the link by invoking the light application.

According to an embodiment of the invention, the opening module 730 can be further configured to, when the light application does not exist in the light application list, open the webpage by a browser.

So far, an apparatus for opening a webpage according to embodiments of the invention has been described. Similar to the above methods, according to the apparatus, it also can open a requested webpage by invoking a light application, thereby avoid interference of an application such as a plug-in that comes with a browser to viewing a webpage by a user, realize that a webpage is shown more friendly, facilitate the use of the user, and improve the user experience.

Since the processing of the apparatus for opening a webpage corresponds to the methods for opening a webpage described in connection with FIG. 4 to FIG. 6, its specific details can refer to the methods for opening a webpage described before and will not be repeated here.

In the above, two improved schemes of opening a webpage have been introduced, and in the following, the scheme of invoking a client of the invention will be introduced, that is, a mobile terminal parses a received webpage data package, and according to the parsed content, determines whether a client corresponding to the parsed content exists, and then performs a corresponding invocation of the corresponding client.

It has been mentioned in the prior art that, since a mobile terminal lacks the ability of further processing received data, much data of a user can not be shared. Such a problem that data can not be fully shared among devices brings much inconvenience to the user, and affects the user experience to a great extent.

Figure 8:
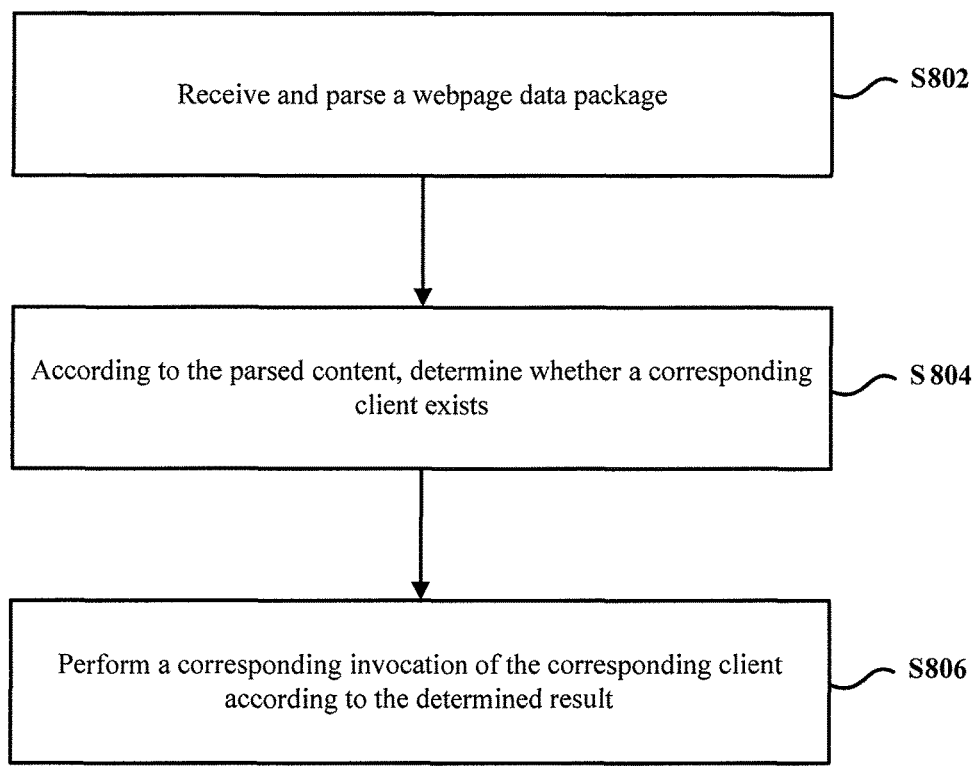
FIG. 8 shows a processing flow chart of a method for invoking a client according to an embodiment of the invention.

To solve the above technical problem, an embodiment of the invention provides a method for invoking a client. FIG. 8 shows a processing flow chart of a method for invoking a client according to an embodiment of the invention. As shown in FIG. 8, the flow comprises at least step S802 to step S806.

At step S802, a webpage data package is received and parsed.

At step S804, according to the parsed content, it is determined whether a client corresponding to the parsed content exists.

At step S806, a corresponding invocation of the corresponding client is performed according to the determined result.

According to the embodiment of the invention, a received webpage data package can be parsed, and a corresponding client is invoked according to the parsed content, which solves the problem in the prior art that it is inconvenient to share data among devices since the received data can not be further processed. By employing the embodiment of the invention, whether a corresponding client exists can be found according to a received webpage data package and an invocation can be performed, which further achieves a beneficial effect of performing reasonable and efficient processing on the received data, facilitates users to share data among different devices, and improves the user experience.

As shown in FIG. 8, in an embodiment of the invention, a long connection server receives a webpage data package sent by a webpage data package sending side, and in the webpage data package is carried identification information of the webpage data package sending side. After receiving the webpage data package, the long connection server determines a webpage data package receiving side according to the identification information carried in the webpage data package. After receiving the webpage data package, the webpage data package receiving side first performs the step S802 to accept the webpage data package forwarded by the long connection server, and parse the webpage data package; second, performs the step S804 to, according to the parsed content, determine whether a client corresponding to the parsed content exists. In particular, in an embodiment of the invention, the webpage data package is parsed to obtain a webpage link corresponding to the webpage data package, and after obtaining the webpage link, a domain name corresponding to the webpage link is obtained according to a preset rule.

In an embodiment of the invention, a mapping is generated with a domain name as a key and a data object as a value. After the corresponding domain name is obtained according to the webpage data package, a corresponding data object is obtained in the mapping according to the domain name. In addition, in an embodiment of the invention, a correspondence table that is updated regularly exists at the webpage data package receiving side, parsing the correspondence table can generate a corresponding data object, and the data object is saved in the mapping. Preferably, in an embodiment of the invention, a data object comprises a domain name of a website, a package name of a client corresponding to a website and a name of a main page of a client.

As described above, after the corresponding data object is obtained by parsing the webpage data package, a corresponding package name is obtained according to the data object. After obtaining the package name, in an embodiment of the invention, a query message carrying the package name is sent to an application program package name management class (PackageManager for short hereinafter) to query whether a client corresponding to the webpage data package exists, and after receiving the query message, the PackageManager queries whether the corresponding client exists according to the package name carried in the query message, and then returns an acknowledge message. In an embodiment of the invention, the step S806 continues to be performed, to receive the acknowledge message returned by the PackageManager. If the acknowledge message returned by the PackageManager is null, the corresponding client does not exist, and in an embodiment of the invention, a browser is used to open a corresponding webpage, and if according to the acknowledge message returned by the PackageManager, the corresponding client exists, the corresponding client is invoked.

In the invention, the identification information can be identity confirmation information set by any user, or also can be any identity confirmation information set by a server for a user, which will not be defined by the invention. Preferably, in an embodiment of the invention, the identification information can be account information logged in by a user of the webpage data package sending side, or can be a unique identification generated by the webpage data package sending side.

In addition, in an embodiment of the invention, it can be that a browser client and a WeChat client receive a webpage data package by a network, or also can be receiving a webpage data package by other communication means such as short information, which will not be defined by the invention. Preferably, in an embodiment of the invention, the webpage data package comprises at least one of the following: each network address collected in the favorites of the webpage data package sending side, commonly used network addresses of the webpage data package sending side, the network address currently opened by the webpage data package sending side, webpage data invoked by the webpage data package sending side according to a user instruction, and the like, which are data of any operations performed by the user of the webpage data package sending side at the sending side. The webpage data package can also be other data updated by the sending side, which will not be defined by the invention in any way.

Figure 9:
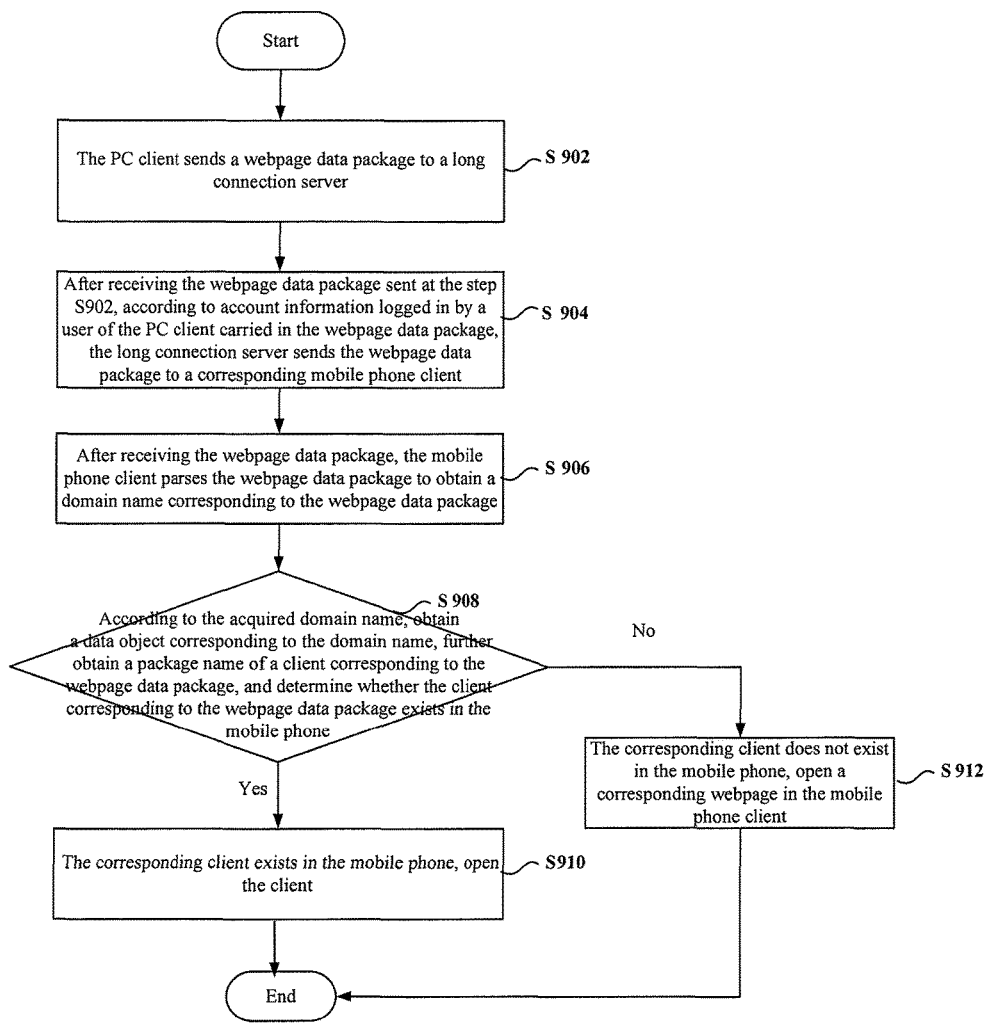
FIG. 9 shows a processing flow chart of a method for invoking a client according to a preferred embodiment of the invention.

FIG. 9 shows a processing flow chart of a method for invoking a client according to a preferred embodiment of the invention, which is used to support any of the above methods for invoking a client and elaborate the method for invoking a client more clearly. It needs to be noted that in the preferred embodiment, the webpage data package sending side is a personal computer client (PC client for short hereinafter), and the webpage data receiving side is a mobile phone client. Referring to FIG. 9, the preferred embodiment comprises at least step S902 to step S912.

At the step S902, the PC client sends a webpage data package to a long connection server.

At the step S904, after receiving the webpage data package sent at the step S902, according to account information logged in by a user of the PC client carried in the webpage data package, the long connection server sends the webpage data package to a corresponding mobile phone client.

At the step S906, after receiving the webpage data package, the mobile phone client parses the webpage data package to obtain a domain name corresponding to the webpage data package.

At the step S908, according to the acquired domain name, a data object corresponding to the domain name is obtained, a package name of a client corresponding to the webpage data package is further obtained, and it is determined whether a client corresponding to the webpage data package exists in the mobile phone. If the corresponding client exists, the step S910 is performed, and if the corresponding client does not exist, the step S912 is performed.

At the step S910, the corresponding client exists in the mobile phone, the client is opened, and the flow ends.

At the step S912, the corresponding client does not exist in the mobile phone, a corresponding webpage is opened in the mobile phone client, and the flow ends.

Figure 10:
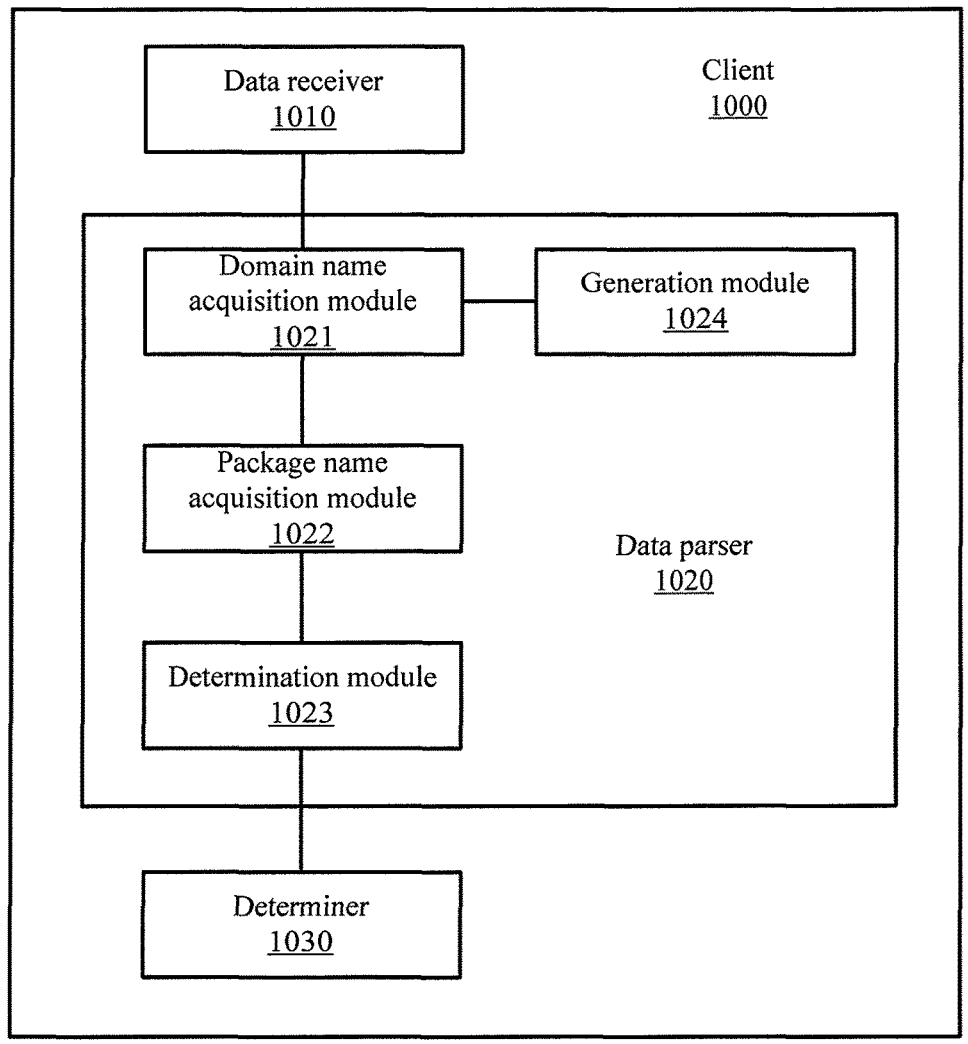
FIG. 10 shows a structural schematic diagram of a client according to an embodiment of the invention.

Based on the methods for invoking a client provided by the above each preferred embodiments and based on the same concept, an embodiment of the invention further provides a client to implement the above methods for invoking a client. FIG. 10 shows a structural schematic diagram of a client according to an embodiment of the invention.

With reference to FIG. 10, the client 1000 of the embodiment of the invention comprises at least: a data receiver 1010, a data parser 1020 and a determiner 1030. Now, functions of each device or component of the client 1000 of the embodiment of the invention and a connection relationship between each part will be introduced.

The data receiver 1010 is configured to receive a webpage data package.

The data parser 1020 is configured to parse the webpage data package.

The determiner 1030 is configured to, according to the parsed content, determine whether a client corresponding to the parsed content exists, obtain the determined result and perform a corresponding invocation.

According to the embodiment of the invention, a received webpage data package can be parsed, and a corresponding client can be invoked according to the parsed content, which solves the problem that data can not be shared among devices since the received data can not be further processed in the prior art. By employing the embodiment of the invention, it can find whether a corresponding client exists according to a received webpage data package and perform an invocation, which further achieves a beneficial effect of performing reasonable and efficient processing on the received data, facilitates users to share data among different devices, and improves the user experience.

As shown in FIG. 10, in an embodiment of the invention, a long connection server receives a webpage data package sent by a webpage data package sending side, and in the webpage data package is carried identification information of the webpage data package sending side. After receiving the webpage data package, the long connection server determines a client 1000 according to the identification information therein. The data receiver 1010 in the client 1000 receives the webpage data package. After reception, the data parser 1020 as shown in FIG. 10 is triggered, and a domain name acquisition module 1021 in the data parser 1020 parses the webpage data package to obtain a corresponding domain name. After obtaining the domain name corresponding to the webpage data package, a package name acquisition module 1022 in the data parser 1020 acquires a corresponding data object in a locally stored mapping according to the domain name, wherein the locally stored mapping is generated by a generation module 1024 in the data parser 1020 with the domain name as a key and the data object as a value. In an embodiment of the invention, a correspondence table that is updated regularly exists at the webpage data package receiving side, parsing the correspondence table can generate a corresponding data object, and the data object is saved in the mapping. Preferably, in an embodiment of the invention, a data object comprises a domain name of a website, a package name of a client corresponding to a website and a name of a main page of a client.

After acquiring the data object, according to the data object, the package name acquisition module obtains a package name corresponding to the webpage data package, and triggers a determination module 1023 to determine by the determination module 1023 whether a corresponding client exists. In particular, the determination module 1023 sends a query message carrying the package name to a PackageManager to query whether a client corresponding to the webpage data package exists, and after receiving the query message, the PackageManager queries whether the corresponding client exists according to the package name carried in the query message, and returns an acknowledge message to the determination module 1023. After receiving the acknowledge message, the determination module 1023 in the data parser 1020 triggers the determiner 1030 to perform a corresponding operation by the determiner 1030 according to the acknowledge message. In particular, if the acknowledge message returned by the PackageManager is null, the corresponding client does not exist, and the determiner 1030 uses a browser to open a corresponding webpage, and if according to the acknowledge message returned by the PackageManager, the corresponding client exists, the determiner 1030 invokes the client.

In the invention, the identification information can be identity confirmation information set by any user, or also can be any identity confirmation information set by a server for a user, which will not be defined by the invention. Preferably, in an embodiment of the invention, the identification information can be account information logged in by a user of the webpage data package sending side, or can be a unique identification generated by the webpage data package sending side.

In addition, in an embodiment of the invention, it can be that a browser client and a WeChat client receive a webpage data package by a network, or also can be receiving a webpage data package by other communication means such as short information, which will not be defined by the invention. Preferably, in an embodiment of the invention, the webpage data package comprises at least one of the following: each network address collected in the favorites of the webpage data package sending side, commonly used network addresses of the webpage data package sending side, the network address currently opened by the webpage data package sending side, and data of operations performed by any user of the webpage data package sending side at the sending side, webpage data invoked by the webpage data package sending side according to a user instruction, and the like, which are data of any operations performed by the user of the webpage data package sending side at the sending side. The webpage data package can also be other data updated by the sending side, which will not be defined by the invention in any way.

According to any of the preferred embodiments or a combination of multiple preferred embodiments, embodiments of the invention can achieve the following beneficial effects:

According to embodiments of the invention, a received webpage data package can be parsed, and a corresponding client can be invoked according to the parsed content, which solves the problem that data can not be shared among devices since the received data can not be further processed in the prior art. By employing the embodiment of the invention, it can find whether a corresponding client exists according to a received webpage data package and perform an invocation, which further achieves a beneficial effect of performing reasonable and efficient processing on the received data, facilitates users to share data among different devices, and improves the user experience.

In the above, two improved schemes of opening a webpage and a scheme of invoking a client have been introduced, and in the following, the scheme of creating a light application of the invention will be introduced, to realize that a light application is created on a second client based on a search on a first client.

To facilitate understanding of the scheme of the invention, in the following, in an embodiment, it can be assumed that the first client may be located at a PC side, and the second client may be located at a mobile phone side, but the actual invention is not limited to this. The first client and the second client only designate two clients, wherein the first client is a light application search side, and the second client is a light application creation side.

Figure 11:
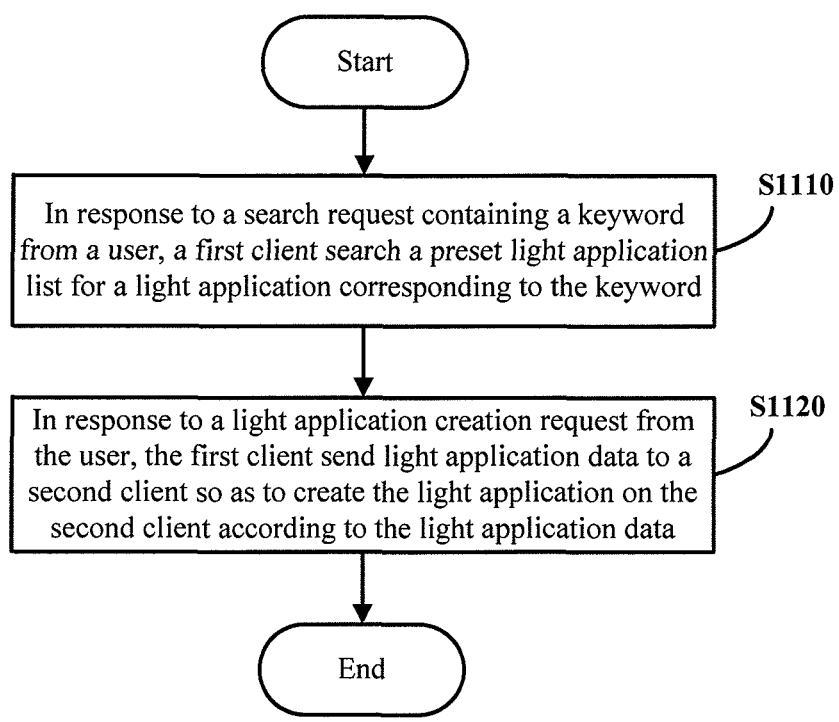
FIG. 11 shows a flow chart of a method for creating a light application according to an embodiment of the invention.

Reference is made to FIG. 11, which shows a flow chart of a method for creating a light application according to an embodiment of the invention. What is described therein is a processing procedure of the light application search side.

As shown in FIG. 11, at step S1110, in response to a search request containing a keyword from a user, a first client searches a preset light application list for a light application corresponding to the keyword.

In particular, in the light application list can store light application data and light application keywords of individual light applications.

According to an embodiment of the invention, the light application list can be pre-established at the first client (a PC side). At this point, the light application list can contain light application data and light application keywords of each light application existing at the first client locally.

According to another embodiment of the invention, the light application list can be downloaded to the first client from a server in advance. More specifically, the first client can, in response to a search request containing a keyword from a user, request acquiring a light application list from the server side. At this point, the light application list can contain light application data and light application keywords of each light application existing at the server side.

Further, when the first client (the PC side) receives a search request containing a keyword from a user, the first client (the PC side) first judges whether the keyword can correspond to a light application in the preset light application list. In particular, the first client can match the keyword in the search request with light application keywords in the light application list, and if a matching light application keyword can be found, a light application corresponding to the search request can be determined.

According to an embodiment of the invention, after a light application corresponding to the keyword in the search request is found, the light application can be displayed to the user, for example, the icon of the light application can be shown to the user.

According to an embodiment of the invention, while, in response to a search request containing a keyword from a user, the first client finds a light application corresponding to the keyword in a preset light application list, it can further request a Web server to acquire a search result related to the search request. According to an embodiment of the invention, the determined light application and the search result can be displayed to the user together. If a matching light application keyword can not be found from the light application list, the search result acquired from the Web server is shown to the user for the user to select a desired application program from the search result.

In an instance, for example, a light application list maintained by the server side is as follows:

```
{
    "name": "19th floor",
    "url": "http://sp.wap.19lou.com/",
    "desc": "domestic largest urban living community",
    "img":
    "http://p0.qhimg.com/d/_reader/t010a371803a4873372.png"
},
{
    "name": "douguo recipe",
    "url": "http://m.douguo.com/",
```

-continued

```
    "desc": "an online cooking exchange platform",
    "img":
      "http://p0.qhimg.com/d/_reader/t01393aa896594f04bc.png"
  }
......
```

Suppose that "douguo recipe" is searched at the PC client, and the PC client can acquire the light application list from the server side and parse it. Then, "douguo recipe" is used to query in the light application list whether a light application with its "name" being "douguo recipe" exists. When it is found that the light application exists in the list, the PC client can insert the light application in a first entry of the search result, and take the corresponding desc of "an online cooking exchange platform" as a description, and add an "Open" button under the description.

Next, at step S1120, in response to a light application creation request from the user, the first client sends light application data to a second client so as to create the light application on the second client according to the light application data.

In particular, after the first client (the PC side) determines the light application and displays it to the user, the user may send a light application creation request to the first client (the PC side) according to the displayed light application. The light application creation request herein refers to a request for creating a light application on another client.

In a specific embodiment, while the first client displays the light application to the user, it can display a light application creation prompt to the user together. For example, it can display "+" aside the icon of the light application, and the "+" is a light application creation prompt. When the user triggers or clicks the displayed light application creation prompt, it means that the user issues a light application creation request to the first client to create a light application on the second client. This will be described in more detail in connection with FIG. 12 later.

According to an embodiment of the invention, in response to the light application creation request from the user, the first client can send light application data to the second client by a wireless connection mode, so as to create a light application on the second client according to the light application data. The wireless connection mode can for example comprise a data transmission mode such as infrared, BlueTooth, a long connection, etc.

In a specific embodiment, in response to the light application creation request from the user, the first client can send light application data to the second client through a long connection server. More specifically, the first client (located at the PC side) and the second client (located at a mobile phone side) can establish a long connection relationship with the long connection server by a way of mutual registration or a specified IP (Internet Protocol) protocol, etc., and it can be realized that multiple data packages are sent continuously in a connection. This will be described in more detail in FIG. 12 later.

According to a further embodiment of the invention, in response to the light application creation request from the user, the first client can send light application data to the second client by a wired connection mode, so as to create a light application on the second client according to the light application data. The wired connection can comprise a data transmission mode such as a USB (Universal Serial Bus) data line connection or an intermediate connected router, etc.

Still using the above instance of searching "douguo recipe" for illustration, when the user clicks the "open" button, the PC client can encrypt the light application data in the form of json {"name": "douguo recipe", "url": "http://m.douguo.com/", "desc": "an online cooking exchange platform", "http://p0.qhimg.com/d/_reader/t01393aa896594f04bc.png"} plus registered information and send them to a PC server. The PC server finds a corresponding long connection server according its registered information, and sends the content to the long connection server. After receiving the data, the long connection server sends the data down to the mobile phone client. After receiving the data, the mobile phone client can parse its data, open the link of the light application of http://m.douguo.com/, and create a shortcut for the light application.

So far, a method for creating a light application according to an embodiment of the invention has been described, wherein based on a keyword search of a first client, a light application can be created onto a second client, there is no need for the second client to request a server for a search so as to create it. Therefore, the use of the user can be facilitated greatly, and the user experience can be improved.

In the following, a method for creating a light application according to another embodiment of the invention will be described with reference to FIG. 12. In this embodiment, a procedure in which a first client creates a light application to a second client is described more specifically. What is described therein is also a processing procedure at a light application search side.

Figure 12:
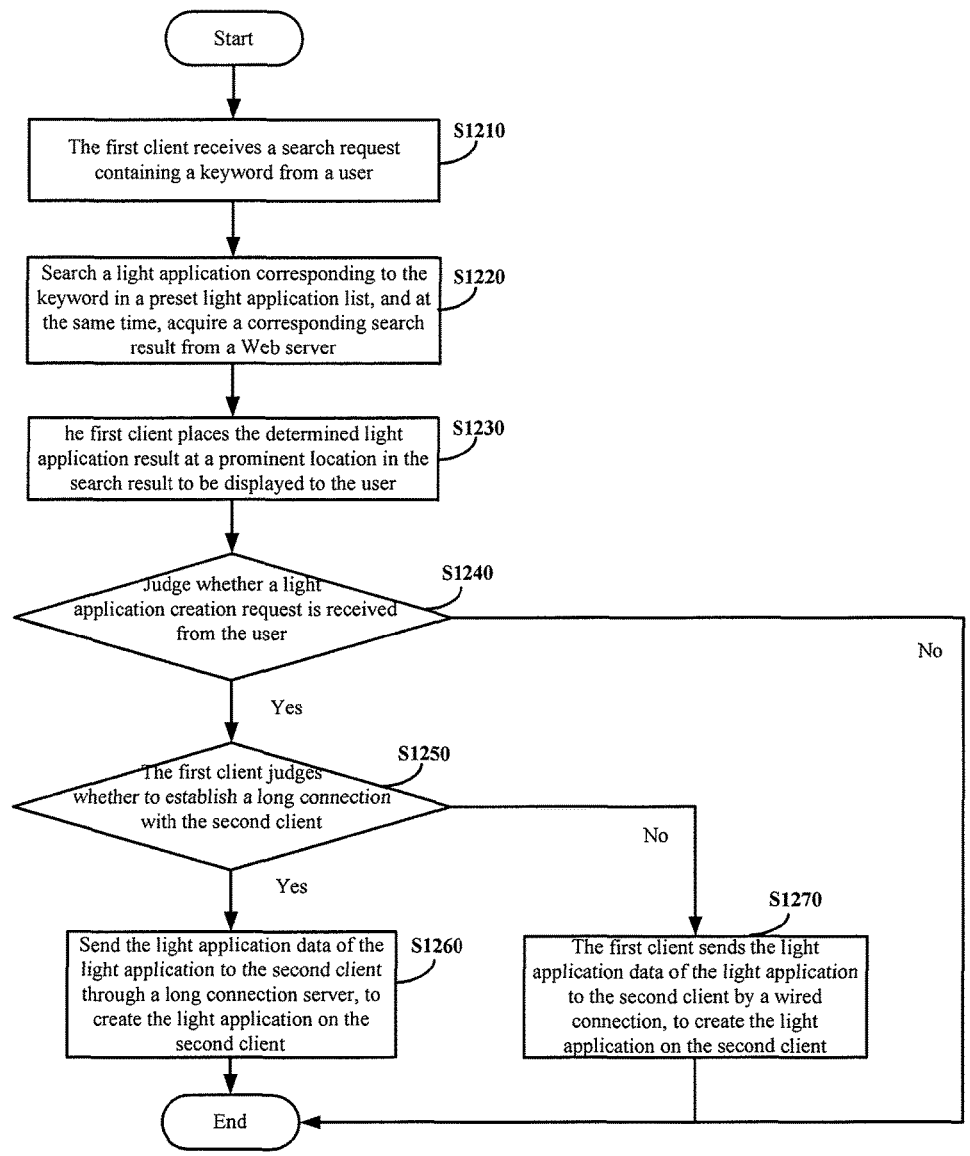
FIG. 12 shows a flow chart of a method for creating a light application according to another embodiment of the invention.

As shown in FIG. 12, at step S1210, the first client receives a search request containing a keyword from a user.

In particular, the first client can receive any search keyword entered in a search input box by the user. For example, when the first client receives a keyword "mp3" entered by the user, it receives a search request with respect to "mp3".

Next, at step S1220, a light application corresponding to the keyword is searched in a preset light application list, and at the same time, a corresponding search result is acquired from a Web server.

In particular, the first client can, in response to a keyword search request from the user, search in a preset light application list whether a light application corresponding to the keyword exists. At the same time, in response to the keyword search request from the user, the first client can further request a Web server to acquire a corresponding search result corresponding to the search request.

As mentioned above, in the light application list can store light application data and light application keywords of each light application.

According to an embodiment of the invention, the light application list can be pre-established at the first client (a PC side). At this point, the light application list can contain light application data and light application keywords of each light application existing at the first client locally.

According to another embodiment of the invention, the light application list can be downloaded to the first client from a server in advance. More specifically, the first client can, in response to a search request containing a keyword from a user, request acquiring a light application list from the server side. At this point, the light application list can contain light application data and light application keywords of each light application existing at the server side.

Further, when the first client receives a search request containing a keyword from a user, the first client first judges whether the keyword can correspond to a light application in the preset light application list. In particular, the first client can match the keyword in the search request with light application keywords in the light application list, and if a matching light application keyword can be found, a light application corresponding to the search request can be determined. If a matching light application keyword can not be found from the light application list, it can be determined that a light application corresponding to the search request does not exist.

Next, at step S1230, the first client places the determined light application result at a prominent location in the search result to be displayed to the user.

According to an embodiment of the invention, the first client (the PC side) can arrange the determined light application in the front of the search result fed back by the Web server, and thereby prompt the user. According to another embodiment of the invention, it also can prompt the light application to the user clearly by placing the light application in a first page of the search result and highlighting the icon or display front of the light application. It should be appreciated that the invention is not limited to such ways of displaying a light application, and instead, the light application can be displayed to the user notably in any suitable way.

At step S1240, it is judged whether a light application creation request is received from the user.

According to an embodiment of the invention, if the first client (the PC side) does not receive a light application creation request from the user, the flow ends, that is, the current user does not want to install the light application. If a light application creation request is received from the user, step S1250 is performed.

In a specific embodiment, while the first client displays the light application to the user, it can display a light application creation prompt to the user together. For example, it can display "+" aside the icon of the light application, and the "+" is a light application creation prompt. When the user sees the light application and the search result fed back by a related Web server displayed on the first client (the PC side), if the user clicks the light application creation prompt "+", then the first client receives a request for the user for creating the light application on a second client. Otherwise, if the light application creation prompt "+" is not clicked, then the first client is deemed not to receive a light application creation request from the user.

At the step S1250, the first client judges whether to establish a long connection with the second client.

According to an embodiment of the invention, when the first client (the PC side) receives a request that the user needs to create the light application on the second client, the first client can first judge whether to establish a long connection with the second client (a mobile phone side).

In particular, the first client (the PC side) can judge whether to establish a long connection relationship with the second client (the mobile phone side) by registered information pre-established with the second client (the mobile phone side) or a specified IP protocol.

Further, the first client (the PC side) can, according to information of a common user name and a terminal attribute, match with information such as a user name, and a terminal attribute, etc. carried when the mobile phone side sends out a request for creating a light application, and if they match, the PC side has already established a long connection with the mobile phone side. Otherwise, a long connection has not been established.

When it is judged at the step S1250 that the first client has already established a long connection with the second client, step S1260 is performed, in which the light application data of the light application is sent to the second client through a long connection server, to create the light application on the second client according to the light application data.

In particular, in the above sending procedure, the first client can directly send the light application data to the long connection server in the form of a data package, and then the long connection server sends the data package to the second client.

According to the embodiment of the invention, that the first client (the PC side) sends the light application data to the second client (the mobile phone side) is realized by a long connection sending mode, which can cause resource information to be shared synchronously at both sides, thereby cause the operations to be more flexible and convenient, and increase the user's operation efficiency.

When at the step S1250 it is judged that the first client has not established a long connection with the second client, step S1270 is performed, in which the first client sends the light application data to the second client by at least one connection mode of an infrared connection, a BlueTooth connection, and a wired connection, to create the light application on the second client according to the light application data.

As mentioned above, the wired connection mode can comprise a wired transmission mode such as a USB (Universal Serial Bus) data line connection or an intermediate connected router, etc.

In particular, in the above sending procedure, the first client can directly send the light application data to the second client in the form of a data package by a wired transmission mode.

So far, methods for creating a light application according to an embodiment of the invention have been described in connection with FIG. 11 and FIG. 12, wherein a light application is created on a second client based on a search on a first client, thereby enhancing the flexibility with which a light application is created, facilitating the use by the user, and improving the user experience.

In the following, a method for creating a light application according to yet still another embodiment of the invention will be described with reference to FIG. 13. What is described therein is a processing procedure at a light application creation side. In this embodiment, it is described more specifically how to create a light application onto a second client after the second client receives light application data sent by a first client.

Figure 13:
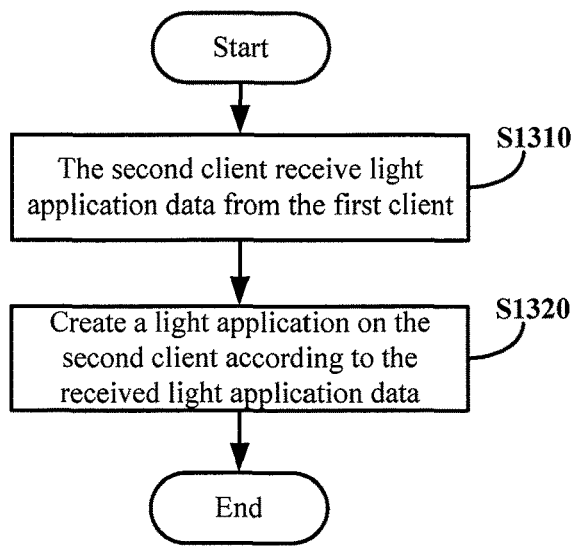
FIG. 13 shows a flow chart of a method for creating a light application according to still another embodiment of the invention.

As shown in FIG. 13, at step S1310, the second client receives light application data from the first client.

According to an embodiment of the invention, the light application data is determined by the first client (a PC side) from a preset light application list according to a keyword contained in a search request from a user.

In particular, after the first client (the PC side) displays a light application desired by the user to the user, the user can select to install it on the second client (a mobile phone side) according to the displayed result. When the user selects to install the light application on the second client (the mobile phone side), the second client (the mobile phone side) will receive the light application data of the light application from the first client (the PC side).

According to an embodiment of the invention, the light application data received by the second client (the mobile phone side) from the first client (the PC side) can be received by a wireless connection mode. In a preferred embodiment, as mentioned at the step S1120 in FIG. 11, when the first client sends the light application data to the second client through a long connection server, the second client can receive from the long connection server the light application data from the first client. In particular, the first client and the second client can be connected in advance by the long connection server, wherein multiple data packages may be transmitted continuously between the first client and the second client through the long connection server. The wireless connection mode can comprise, but is not limited to, a BlueTooth connection, and an infrared connection, etc.

According to another specific embodiment of the invention, the PC client (the first client) can send the light application data to a PC assistant, and the PC assistant writes the light application data at a specific location of a memory card of the mobile phone (the second client) by a wireless connection of a mobile phone assistant.

According to another embodiment of the invention, the light application data received by the second client (the mobile phone side) from the first client (the PC side) can be received by a wired connection mode. As mentioned at the step S1120 in FIG. 11, when the first client sends the light application data in a wired connection mode, the second client can likewise receive it by the same wired connection mode.

In particular, the second client can receive the light application data in the form of a data package from the first client.

At step S1320, a light application is created on the second client according to the received light application data.

In particular, when receiving the light application data in the form of a data package, the second client can parse the data package to acquire a link to a light application, and in turn the light application is opened on the second client. In a preferred embodiment, while a light application is opened according to its link to the light application, a shortcut can be created onto the second client with respect to the light application.

According to a specific embodiment of the invention, after receiving the data package, the second client can parse the data package to generate a corresponding WebappInfo object, and the corresponding light application can be opened by invoking startApp( ). For example, the execution code is as follows:

```
public static void startApp(Context context, WebappInfo info){
// This is to invoke a specific execution action of opening a light
application
Intent intent = new Intent("com.qihoo.browser.action.WEBAPP_LINK");
// Transfer the light application information as a parameter
Intent.putExtra("data",info);
   context.startActivity(intent);
}
```

According to another specific embodiment of the invention, when the PC client (the first client) sends the light application data to a PC assistant, and the PC assistant writes the light application data at a specific location of a memory card of the mobile phone (the second client) by a wireless connection of a mobile phone assistant, a corresponding command can be sent to open the mobile phone client at the same time, the mobile phone client reads information at the specific location of the memory card after started, and parses it to generate a WebAppInfo object, opens the light application by startApp( ), and creates a corresponding shortcut.

So far, a method for creating a light application according to another embodiment of the invention has been described, wherein based on light application data sent by a first client, a second client can create a light application locally, there is no need for the second client to connect a server again to search and create the light application, thereby achieving that a light application is created more flexibly, facilitating the use by the user, and improving the user experience.

Similar to the method for creating a light application, according to an embodiment of the invention, there is further provided a client for creating a light application.

Figure 14:
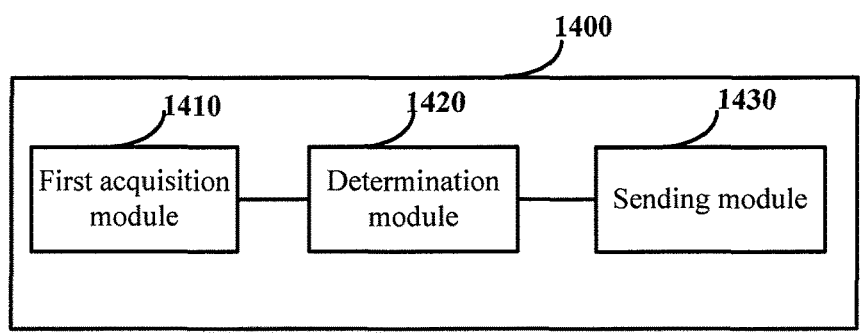
FIG. 14 shows a structural block diagram of a client for creating a light application according to an embodiment of the invention.

Reference is made to FIG. 14, which is a structural block diagram of a client 1400 according to an embodiment of the invention. What is described therein is a light application search side.

As shown in FIG. 14, the client 1400 can comprise a first acquisition module 1410, a determination module 1420 and a sending module 1430.

In particular, the first acquisition module 1410 can be configured to, in response to a search request containing a keyword from a user, search a preset light application list for a light application corresponding to the keyword.

The determination module 1420 can be configured to, according to the keyword, determining light application data corresponding to the keyword from the light application list.

The sending module 1430 can be configured to, in response to a light application creation request from the user, send the light application data to a further client so as to create the light application according to the light application data.

According to an embodiment of the invention, the sending module 1430 can further comprise: a judgment sub-module which may be configured to, in response to a light application creation request from the user, confirm whether a long connection has been established with a further client; a first connection sub-module which may be configured to, when a long connection has been established, send the light application data to the further client through a long connection server, to create the light application on the further client according to the light application data; and a second connection sub-module which can be configured to, when a long connection has not been established, send the light application data to the further client by at least one connection mode of an infrared connection, a BlueTooth connection, and a wired connection, to create the light application on the further client according to the light application data.

According to an embodiment of the invention, the client 1400 may further comprise: a second acquisition module which may be configured to, with respect to the search request, acquire a corresponding search result from a Web server; and a display module which may be configured to display the search result to the user.

In a preferred embodiment, the display module can be further configured to place the determined light application result at a prominent location in the search result to be displayed to the user.

So far, a client for creating a light application according to an embodiment of the invention has been described. Similar to the method described in FIG. 11, according to the client, it can be likewise realized that a light application is created flexibly, thereby facilitating the use by the user, and improving the user experience.

Figure 15:
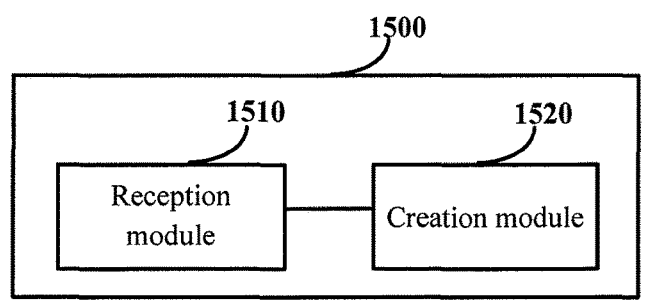
FIG. 15 shows a structural block diagram of a client for creating a light application according to another embodiment of the invention.

Reference is made to FIG. 15, which is a structural block diagram of a client 1500 according to another embodiment of the invention. What is described therein is a light application creation side.

As shown in FIG. 15, the client 1500 may comprise a reception module 1510 and a creation module 1520.

In particular, the reception module 1510 can be configured to receive light application data from an other client, wherein the light application data is determined by the other client from a preset light application list according to a keyword contained in a search request from a user. The creation module 1520 can be configured to create a light application according to the received light application data.

According to an embodiment of the invention, the reception module 1510 can receive the light application data from the other client via a long connection server.

According to another embodiment of the invention, the reception module 1510 can receive the light application data from the other client via at least one connection mode of an infrared connection, a BlueTooth connection, and a wired connection.

So far, a client for creating a light application according to another embodiment of the invention has been described. Similar to the method described in FIG. 13, according to the client, a light application can be likewise created flexibly, thereby facilitating the use by the user, and improving the user experience.

Since the processing of the client of creating a light application corresponds to that of the methods for creating a light application described above in connection with FIG. 11 to FIG. 13, its details can refer to the methods for creating a light application described previously, and will not be repeated here any more.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

Similarly, it shall be appreciated that in order to simplify the disclosure and help the understanding of one or more of all the inventive aspects, in the above description of the exemplary embodiments of the invention, sometimes individual features of the invention are grouped together into a single embodiment, figure or the description thereof. However, the disclosed methods should not be construed as reflecting the following intention, namely, the claimed invention claims more features than those explicitly recited in each claim. More precisely, as reflected in the following claims, an aspect of the invention lies in being less than all the features of individual embodiments disclosed previously. Therefore, the claims complying with a particular implementation are hereby incorporated into the particular implementation, wherein each claim itself acts as an individual embodiment of the invention.

It may be appreciated to those skilled in the art that modules in a device in an embodiment may be changed adaptively and arranged in one or more device different from the embodiment. Modules or units or assemblies may be combined into one module or unit or assembly, and additionally, they may be divided into multiple sub-modules or sub-units or subassemblies. Except that at least some of such features and/or procedures or units are mutually exclusive, all the features disclosed in the specification (including the accompanying claims, abstract and drawings) and all the procedures or units of any method or device disclosed as such may be combined employing any combination. Unless explicitly stated otherwise, each feature disclosed in the specification (including the accompanying claims, abstract and drawings) may be replaced by an alternative feature providing an identical, equal or similar objective.

Furthermore, it can be appreciated to the skilled in the art that although some embodiments described herein comprise some features and not other features comprised in other embodiment, a combination of features of different embodiments is indicative of being within the scope of the invention and forming a different embodiment. For example, in the following claims, any one of the claimed embodiments may be used in any combination.

Embodiments of the individual components of the invention may be implemented in hardware, or in a software module running on one or more processors, or in a combination thereof. It will be appreciated by those skilled in the art that, in practice, some or all of the functions of some or all of the components in an apparatus for opening a webpage and a device for invoking a client according to individual embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 16:
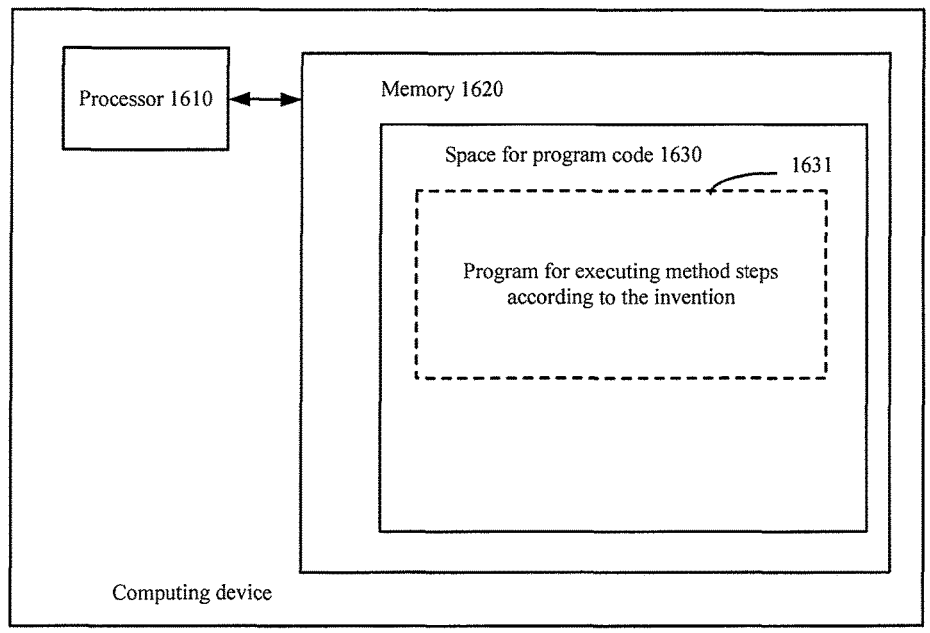
FIG. 16 shows schematically a block diagram of a computing device for performing a method for opening a webpage, a method for invoking a client, and/or a method for creating a light application according to the invention.
Figure 17:
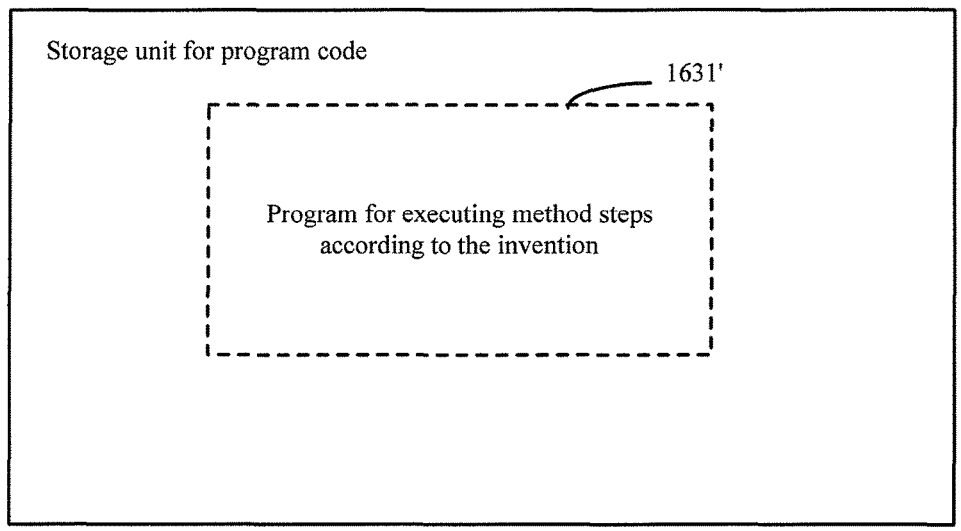
FIG. 17 shows schematically a storage unit for retaining or carrying a program code implementing a method for opening a webpage, a method for invoking a client, and/or a method for creating a light application according to the invention.

For example, FIG. 16 shows a computing device which may carry out a method for opening a webpage, a method for invoking a client, and/or a method for creating a light application according to the invention. The computing device traditionally comprises a processor 1610 and a computer program product or a computer readable medium in the form of a memory 1620. The memory 1620 may be an electronic memory such as a flash memory, an EEPROM (electrically erasable programmable read-only memory), an EPROM, a hard disk or a ROM. The memory 1620 has a memory space 1630 for a program code 1631 for carrying out any method steps in the methods as described above. For example, the memory space 1630 for a program code may comprise individual program codes 1631 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 17. The storage unit may have a memory segment, a memory space, etc. arranged similarly to the memory 1620 in the computing device of FIG. 16. The program code may for example be compressed in an appropriate form. In general, the storage unit comprises a computer readable code 1631', i.e., a code which may be read by e.g., a processor such as 1610, and when run by a computing device, the codes cause the computing device to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several apparatuses, several of the apparatuses may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A computer-implemented method for opening a webpage, comprising:
   receiving, by a processor, a webpage opening request containing a link;
   according to the link, searching, by the processor, a preset application list for a client application or a light application corresponding to the link; and
   when the client application or the light application exists in the application list, opening, by the processor, the client application or invoking the light application to open a webpage corresponding to the link;
   wherein the application list comprises a client application list and a light application list;
   wherein the client application list is pre-established by the processor based on:
      acquiring a client application configuration file;
      parsing the client application configuration file to acquire a client application domain name and a corresponding client application data object; and
      storing the acquired client application domain name and corresponding client application data object in the client application list; and
   wherein the light application list is pre-established by the processor based on:
      acquiring a light application configuration file;
      parsing the light application configuration file to acquire a light application access link and a corresponding light application data object; and
      storing the acquired light application access link and corresponding light application data object in the light application list.

2. The computer-implemented method as claimed in claim 1, wherein the steps of, according to the link, searching, by the processor, a preset application list for a client application or a light application corresponding to the link; and when the client application or the light application exists in the application list, opening, by the processor, the client application or invoking the light application to open a webpage corresponding to the link, further comprise:
   according to the link, searching, by the processor, the preset client application list for a client application corresponding to the link;
   when the client application exists in the client application list, opening, by the processor, the client application;
   when the client application does not exist in the client application list, according to the link, searching, by the processor, the preset light application list for a light application corresponding to the link; and
   when the light application exists in the light application list, opening, by the processor, a webpage corresponding to the link by invoking the light application.

3. The method as claimed in claim 1, wherein the step of receiving, by the processor, a webpage opening request containing a link further comprises:
   receiving, by the processor, a webpage data package from a long connection server; and
   parsing out, by the processor, the link from the webpage data package.

4. The method as claimed in claim 2, wherein the step of, according to the link, searching, by the processor, the preset client application list for a client application corresponding to the link, further comprises:
   parsing out, by the processor, a domain name corresponding to the link from the link; and
   according to the domain name, searching, by the processor, the preset client application list for a client application corresponding to the domain name.

5. The method as claimed in claim 2, wherein the step of, according to the link, searching, by the processor, the preset light application list for a light application corresponding to the link, further comprises:
   parsing out, by the processor, a domain name corresponding to the link from the link; and
   according to the domain name, searching, by the processor, the preset light application list for a light application corresponding to the domain name.

6. The method as claimed in claim 1, further comprising:
   acquiring, by the processor, the latest update time of the light application configuration file; and
   when the interval from the latest update time to the current time is greater than a preset interval time, updating, by the processor, the light application configuration file and updating the light application list accordingly.

7. The method as claimed in claim 1, further comprising:
   when the client application or the light application does not exist in the application list, opening, by the processor, the webpage by a browser.

8. An apparatus for opening a webpage, comprising:
   a memory having instructions stored thereon;
   a processor configured to execute the instructions to perform following operations:
   receiving a webpage opening request containing a link;
   according to the link, searching a preset application list for a client application or a light application corresponding to the link; and
   when the client application or the light application exists in the application list, opening the client application or invoking the light application to open a webpage corresponding to the link;
   wherein the application list comprises a client application list and a light application list;
   wherein the client application list is pre-established by the following steps:
      acquiring a client application configuration file;
      parsing the client application configuration file to acquire a client application domain name and a corresponding client application data object; and
      storing the acquired client application domain name and corresponding client application data object in the client application list; and
   wherein the light application list is pre-established by the following steps of:
      acquiring a light application configuration file;
      parsing the light application configuration file to acquire a light application access link and a corresponding light application data object; and storing the acquired light application access link and corresponding light application data object in the light application list.

9. The apparatus as claimed in claim 8, wherein the steps of, according to the link, searching a preset application list for a client application or a light application corresponding to the link; and when the client application or the light application exists in the application list, opening the client application or invoking the light application to open a webpage corresponding to the link comprises:

according to the link, searching the preset client application list for a client application corresponding to the link;

when the client application exists in the client application list, opening the client application;

when the client application does not exist in the client application list, according to the link, searching the preset light application list for a light application corresponding to the link; and when the light application exists in the light application list, opening a webpage corresponding to the link by invoking the light application.

10. The apparatus as claimed in claim 8, wherein the step of receiving a webpage opening request containing a link further comprises:

receiving a webpage data package from a long connection server; and parsing out the link from the webpage data package.

11. The apparatus as claimed in claim 9, wherein the step of, according to the link, searching the preset client application list for a client application corresponding to the link, further comprises:

parsing out a domain name corresponding to the link from the link; and according to the domain name, searching the preset client application list for a client application corresponding to the domain name.

12. The apparatus as claimed in claim 9, wherein the step of, according to the link, searching the preset light application list for a light application corresponding to the link, comprises:

parsing out a domain name corresponding to the link from the link; and according to the domain name, searching the preset light application list for a light application corresponding to the domain name.

13. The apparatus as claimed in claim 12, wherein operations further comprise:

acquiring the latest update time of the light application configuration file; and when the interval from the latest update time to the current time is greater than a preset interval time, updating the light application configuration file and updating the light application list accordingly.

14. The apparatus as claimed in claim 8, wherein operations further comprise:

when the client application or the light application does not exist in the application list, opening the webpage by a browser.

15. A non-transitory computer readable medium having instructions stored thereon that, when executed by at least one processor, cause the at least one processor to perform following operations:

receiving a webpage opening request containing a link;

according to the link, searching a preset application list for a client application or a light application corresponding to the link; and when the client application or the light application exists in the application list, opening the client application or invoking the light application to open a webpage corresponding to the link;

wherein the application list comprises a client application list and a light application list;

wherein the client application list is pre-established by the following steps:

acquiring a client application configuration file;

parsing the client application configuration file to acquire a client application domain name and a corresponding client application data object; and storing the acquired client application domain name and corresponding client application data object in the client application list; and wherein the light application list is pre-established by the following steps of:

acquiring a light application configuration file;

parsing the light application configuration file to acquire a light application access link and a corresponding light application data object; and storing the acquired light application access link and corresponding light application data object in the light application list.

* * * * *